United States Patent [19]
Bracho et al.

[11] Patent Number: 5,974,417
[45] Date of Patent: *Oct. 26, 1999

[54] DATABASE NETWORK CONNECTIVITY PRODUCT

[75] Inventors: Rafael Bracho, Cupertino; Tilman Sporkert, San Jose, both of Calif.

[73] Assignee: Sun Microsystems, Inc., Palo Alto, Calif.

[ * ] Notice: This patent is subject to a terminal disclaimer.

[21] Appl. No.: 09/149,935

[22] Filed: Sep. 9, 1998

Related U.S. Application Data

[63] Continuation of application No. 08/588,142, Jan. 18, 1996, Pat. No. 5,873,084.

[51] Int. Cl.⁶ ........................................ G06F 17/30
[52] U.S. Cl. ............... 707/10; 707/104; 395/200.31; 395/200.61
[58] Field of Search ............... 707/10, 104; 395/200.61, 395/200.31

[56] References Cited

U.S. PATENT DOCUMENTS

| | | | |
|---|---|---|---|
| 4,751,635 | 6/1988 | Kret | 364/200 |
| 4,823,122 | 4/1989 | Mann et al. | 340/825.28 |
| 4,897,781 | 1/1990 | Chang et al. | 364/200 |

(List continued on next page.)

FOREIGN PATENT DOCUMENTS

| | | | |
|---|---|---|---|
| 0 108 233 | 5/1984 | European Pat. Off. | G06F 15/16 |
| 0 130 375 | 1/1985 | European Pat. Off. | G06F 15/40 |
| 0 167 725 | 1/1986 | European Pat. Off. | G06F 5/00 |
| 0 216 535 | 4/1987 | European Pat. Off. | G06F 15/16 |
| 0 258 867 | 3/1988 | European Pat. Off. | G06F 9/46 |
| 2 191 069 | 12/1987 | United Kingdom | G09G 1/00 |
| 2 205 018 | 11/1988 | United Kingdom | G06F 15/40 |

OTHER PUBLICATIONS

Kenneth Birman et al., "Reliable Communication in the Presence of Failures," Feb. 1987, ACM Transactions on Computer Systems, vol. 5, No. 1 pp. 47–76.

Kenneth Birman et al., "Exploiting Virtual Synchrony in Distributed Systems," 1987, ACM pp. 123–138.

(List continued on next page.)

*Primary Examiner*—Thomas G. Black
*Assistant Examiner*—Frantz Coby
*Attorney, Agent, or Firm*—Graham & James LLP

[57] ABSTRACT

A method and apparatus for publishing and receiving events to a network. A plurality of "publisher" entities publish information and a plurality of "subscriber" entities request and use the information. Publishers and subscribers are connected to each other through a network. The network is a "store and forward" network whose routing is "content-based." The basic quanta of information is called an "event." Publishers publish events and subscribers subscribe to events that match criteria defined by the subscriber. Publication and subscription are performed asynchronously. Publishers and subscribers do not have direct knowledge of each other. The system receives a published event from a publisher and routes the event to all appropriate subscribers. Each subscriber is guaranteed to receive all events published on the system if, and only if, they match the subscription criteria specified by the subscriber. A legacy data base can be added to the network by way of a data base connector, which can be a publisher, a subscriber, or both.

8 Claims, 16 Drawing Sheets

U.S. PATENT DOCUMENTS

| | | | |
|---|---|---|---|
| 4,975,904 | 12/1990 | Mann et al. ............................. | 370/85.1 |
| 4,975,905 | 12/1990 | Mann et al. ............................. | 370/85.1 |
| 5,058,108 | 10/1991 | Mann et al. ............................. | 370/85.1 |
| 5,151,989 | 9/1992 | Johnson et al. ........................ | 395/610 |
| 5,187,787 | 2/1993 | Skeen et al. ............................ | 395/600 |
| 5,257,369 | 10/1993 | Skeen et al. ............................ | 395/650 |
| 5,339,392 | 8/1994 | Risberg et al. ......................... | 395/161 |
| 5,347,632 | 9/1994 | Fillep et al. ............................ | 395/200 |
| 5,404,491 | 4/1995 | Huzenlaub et al. .................... | 395/500 |
| 5,406,475 | 4/1995 | Kouchi et al. .......................... | 364/401 |
| 5,442,771 | 8/1995 | Filepp et al. ............................ | 395/650 |
| 5,491,818 | 2/1996 | Malatesta et al. ...................... | 395/610 |
| 5,539,903 | 7/1996 | Kaplan et al. .......................... | 395/610 |
| 5,557,798 | 9/1996 | Skeen et al. ............................ | 395/650 |
| 5,594,910 | 1/1997 | Filepp et al. ............................ | 395/800 |
| 5,873,084 | 2/1999 | Bracho et al. ........................... | 707/10 |

OTHER PUBLICATIONS

Kenneth Birman et al., "The ISIS System Manual," Mar. 15, 1988, pp. 1–212.

Kenneth Birman et al., "ISIS Documentation: Release 1," Jul. 1987.

Kenneth Birman et al., "ISIS and the META Project," 1989, Sun Technology, pp. 90–104.

Nicholas Carriero et al., "Linda In Context," 1989, ACM, Artificial Intelligence & Language Processing, J. Cohen, Editor.

David R. Cheriton et al., "Distributed Process Groups in the V Kernel," May 1985, ACM Transactions on Computer Systems, vol. 3, No. 2 pp. 77–107.

C. Anthony DellaFera et al., "Zephyr Notification Service", Section E.4.1, Jun. 5, 1989, Massachusetts Institute of Technology, pp. 1–35.

C. Anthony DellaFera et al., "Zephyr Notification Service", Section, Abstract, Feb. 1988, Massachusetts Institute of Technology pp. 1–9.

Ariel J. Frank et al., "Multicast Communication on Network Computers," May 1995, pp. 49–61, IEEE Software.

Robert S. French et al., "The Zephyr Programmer's Manual" Protocol Version ZEPHO.2, Apr. 5, 1989, pp. 1–82.

Phillip B. Gibbons, "A Stub Generator for Multilanguage RPC in Heterogeneous Environments," Jan. 1987, IEEE Transactions on Software Engineering, vol. SE 13, No. 1 pp. 77–87.

Ronald D. Gordon, "Providing Multiple–Channel Communication Using the Experimental Digital Switch," Jun. 1982, IEEE Transactions on Communications, vol. Com–30, No. 6 pp. 1409–1416.

Larry Hughes "A Multicast Interface for UNIX 4.3" Jan. 1988 Software Practice and Experience vol. 18(1) pp. 15–27.

V. Y. Lum et al., "A General Methodology for Data Conversion and Restructuring," Sep. 1976, Data Conversion, vol. 20, No. 5 pp. 483–497.

Steven P. Reiss, "Integration Mechanisms in the Field Environment," Oct. 1988, Brown University, Computer Science Department pp. 1–21.

M. Schroeder et al., "Experience with Grapevine: The Growth of a Distributed System," Feb. 1984, ACM Transactions on Computer Systems, vol. 2, No. 1 pp. 3–23.

Dale Skeen, "Reliable Message Diffusion," Oct. 1987, pp. 1–29, IBM Almaden Research Center.

Andrew S. Tanenbaum et al., "A Retrospective and Evaluation of the Amoeba Distributed Operating System," Dept. of Mathematics and Computer Science Vrije Universiteit, Amsterdam, The Netherlands, pp. 1–25, no date.

IBM, "Bind the Business Together Without Tying it Down," MQ Series®, Commercial Messaging, Ver. 1, Release 3.0, no date.

Leslie Yeamans, "Transactional Messaging", OTM Spectrum Reports, (Nov. 1993), vol. 7, Report 4, pp. 13–21.

Henderson, H., The USENET System (1987).

Source Code for file tk_news.c (including a facility called the "News Service" and hereafter referred to as "Old News") (dated May 1990, Feb. 24, 1988, and Dec. 14, 1987).

Answer and Counter Claims of Defendant Isis Distributed Systems, Inc. Isis Distributed Systems, Inc. v. Teknekron Software Systems, Inc., US District Ct. (Northern District of New York), Case No. 93–CV–268–FJS–GJD, dated Jul. 28, 1997, 25 pages.

IBM Technical Disclosure Bulletin, "Revisable Form Document Conversion," (Oct. 1985), vol. 28, No. 5, pp. 2160–2161.

Installing an Application (Publisher) on a Hub

Publishing Events

Subscribing to Events

The following gives the important data fields of the classes in the diagram of Fig. 6(a).

Client: name, id, event queue, event queue pushconsumer, AdSourceRef list, Subscription list, my cost, their cost AdSourceRef: pointer to AdSource RemoteAd: name, eventtype name, priority, storage mode, time to live, originating hub, originating territory, AdSource list, current AdSource AdSource: Sink list, cost Sink: SubscriptionRef list SubscriptionRef: pointer to Subscription Subscription: eventtype name, filter expression, owner id, subscription id, reference count, (for remote subscriptions: neighbor owner id, neighbor subscription id, ad name, ad originating hub)

FIG. 6(b)

Installed advertisements for this hub

| Advert Name | Event Description | Freq of Publication | Event Type | Priority | Time To Live |
|---|---|---|---|---|---|
|  |  |  |  |  |  |

700

Registered clients of this hub 734  736  737  740  742

| Application Name | User Name | User Password | Hub Name | Territory Name | Flags | Client ID |
|---|---|---|---|---|---|---|
|  |  |  |  |  |  |  |

730

Registered publications for this hub

764

| Client ID | Advert Name | Publication ID |
|---|---|---|
|  |  |  |

760

Registered subscriptions for this hub

774

| Client ID | Content Filter Info (if any) | Event Type | Subscription ID |
|---|---|---|---|
|  |  |  |  |

Envelope Format
of Event

Routing Blocks of an Event

Populating Data Structures of Hubs

How Subscriptions Propagate back along least-cost route

DATABASE NETWORK CONNECTIVITY PRODUCT

RELATED APPLICATIONS

This application is a continuation of parent application U.S. patent application Ser. No. 08/588,142, now U.S. Pat. No. 5,873,084 entitled "Data Network Connectivity Product", of Bracho and Sporkert, and claims priority to and incorporates by reference U.S. patent application Ser. No. 08/588,535, now U.S. Pat. No. 5,870,605 entitled Middleware for Enterprise Information Distribution" of Bracho and Jankowski

APPENDICES

Computer Program A, which is a part of this specification and is herein incorporated by reference, contains a summary of exemplary system events that can be passed between hubs in a preferred embodiment of the present invention.

BACKGROUND OF THE INVENTION

This application relates to an information publishing system and, more particularly, to a method and apparatus for connecting a legacy data base to an information publishing system.

Certain conventional systems use a "transactional" model for exchanging information between nodes of data processing system. In a conventional transactional model, two applications initiate a synchronous "transaction" that is maintained for as long as information is being exchanged between the nodes. The transactional model requires that a transaction be defined for each business activity. When nodes on widely disparate portions of a network attempt to communicate via the transaction model it is often difficult to define a transaction that works well on all parts of the system. Moreover, a transaction can only involve the nodes that began the transaction. Another node cannot join the transaction in the middle. This scheme is unsuited for a system in which nodes do not know about all other nodes in the system.

Many commercial enterprises still use software that was developed long ago and is no longer supported by its manufacturer. Such software is called "legacy software." In addition, many commercial enterprises use commercial software products. It is not always possible or desirable to modify existing commercial software and legacy software to operate with a new networked system. The commercial software and legacy software may be very complex, making it difficult and expensive to modify. A company may be wary of making modifications to a stable system that is working consistently. Moreover, there may not be any computer programmers at a company who understand the legacy system in enough detail that they can make modifications to it. Lastly, a company may not have the source code for a legacy application if it purchased the application from a commercial vendor. A company also may not have a legal right to modify commercial data base software. What is needed is a way to integrate commercial and legacy data base software into a networked system without having to modify the data base software itself.

SUMMARY OF THE INVENTION

The present invention overcomes the problems and disadvantages of the prior art by providing a "data base connector" element that can act as either a publisher or a subscriber in the network.

The present invention is implemented as a type of "middleware." Middleware is software that is located between an application program and a control-level program. Middleware is "network centric" and does not concentrate on a specific user interface or on the organization of a specific database. The described embodiment includes a plurality of "publisher" entities, who publish information, and a plurality of "subscriber" entities, who request and use the information. Publishers and subscribers are connected to each other through a network. The network is a "store and forward" network whose routing is "content-based." In a content-based routing system, information is routed based on the content of the information, and not on the addresses of publishers or subscribers in the system. In the described embodiment, information is distributed to many subscribers in parallel.

In the described embodiment, the basic quanta of information is called an "event." Publishers publish events and subscribers subscribe to events that match criteria defined by the subscriber. In the described embodiment, events are represented by data structures in the C programming language, although any appropriate representation can be used.

Publication and subscription are performed asynchronously. Publishers and subscribers do not have direct knowledge of each other. The system receives published event from a publisher and routes the event to all appropriate subscribers. Each subscriber is guaranteed to receive all events published on the system if, and only if, they match the subscription criteria specified by the subscriber.

The described embodiment includes an Application Programming Interface (API) for publishers and for subscribers. The API defines a plurality of procedures that allow respective publishers and subscribers to interface to the system. Thus, various types of publishers and subscribers can be connected to the system, as long as they use the interface procedures defined in accordance with the API. The described embodiment also includes support for a plurality of software elements such as common databases, installation and administration tools, and logging facilities. Thus, the described embodiment is termed an "enterprise system" because it can be used throughout the entirety of a commercial enterprise.

The described embodiment of the present invention makes it easy to integrate legacy systems, legacy applications, and legacy hardware into the system and attempts to minimize the amount of information that a user must learn to use the system. Because communication within the system is based on asynchronous "events," the present invention can be implemented on a heterogeneous network that includes both PCs and mainframes executing under various operating systems and running various types of applications. The described embodiment utilizes a distributed-object environment and a preferred embodiment of the present invention implements the Common Object Request Broker (CORBA) standard.

In accordance with the purpose of the invention, as embodied and broadly described herein, the invention relates to a method of connecting a data base to a publisher/subscriber network, so that the data base can publish events to the network, the method comprising the steps, performed by the data processing system, of: providing a link so that the data base can communicate with a data base connector computer program by way of a transaction monitor computer program; setting up the data base connector as a publisher hub in the network; receiving input, by the data base, from a user that alters data in the data base; informing the transaction monitor that the data has been altered; receiving input from the user indicating that the altered data should be committed; informing the transaction monitor that the altered data is committed; and sending, by the data base connector, in accordance with a message from the transaction monitor that the data is committed, a published event to the network in accordance with the altered data.

Objects and advantages of the invention will be set forth in part in the description which follows and in part will be obvious from the description or may be learned by practice of the invention. The objects and advantages of the invention will be realized and attained by means of the elements and combinations particularly pointed out in the appended claims and equivalents.

BRIEF DESCRIPTION OF THE DRAWINGS

The accompanying drawings, which are incorporated in and constitute a part of this specification, illustrate several embodiments of the invention and, together with the description, serve to explain the principles of the invention.

FIG. 6(b) is a listing of details of the data structures of FIG. 6(a).

FIG. 7 is a diagram of additional data structures stored in the memory of the hub of FIG. 5 for the purpose of storing information about clients of the hub.

DETAILED DESCRIPTION OF THE PREFERRED EMBODIMENTS

Reference will now be made in detail to the preferred embodiments of the invention, examples of which are illustrated in the accompanying drawings. Wherever possible, the same reference numbers will be used throughout the drawings to refer to the same or like parts.

I. Overview

Figure 1:
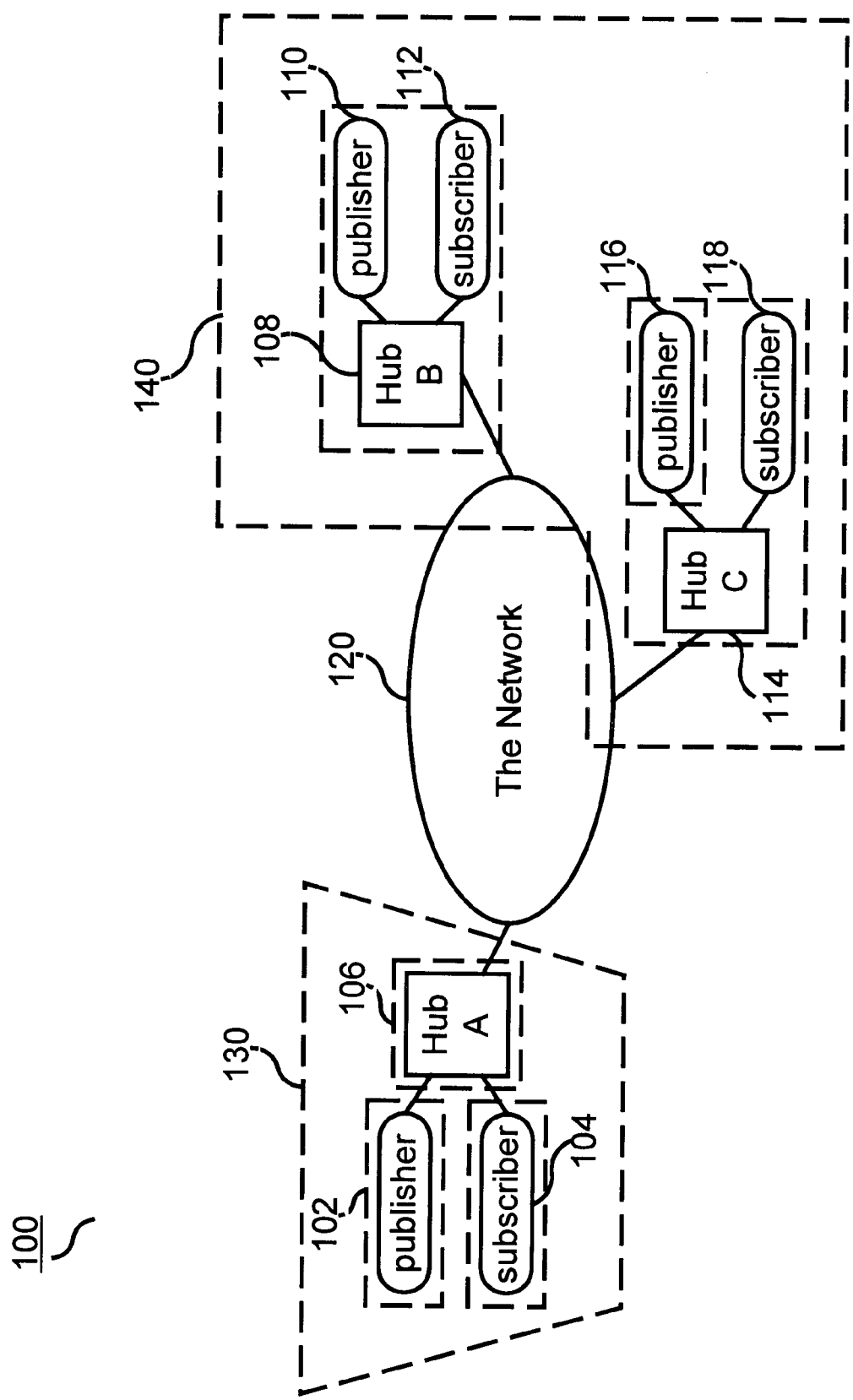
FIG. 1 is a block diagram of a networked computer system in accordance with a preferred embodiment of the present invention.

FIG. 1 is a block diagram of a networked computer system 100 in accordance with a preferred embodiment of the present invention. Networked computer system 100 includes a plurality of publishers 102, 110, and 116 and a plurality of subscribers 104, 112, and 118. Publisher 102 and subscriber 104 are connected to a network 120 through a hub 106. Publisher 110 and subscriber 112 are connected to network 120 through a hub 108. Publisher 116 and subscriber 118 are connected to network 120 through a hub 114. Hub 106 and its connected publishers and subscribers are in a first territory 130. Hubs 108 and 114 and their connected publishers and subscribers are in a second territory 140. Other territories (not shown) also exist in network 120. "Hubs," "publishers," "subscribers," and "territories" are discussed below in turn.

As indicated by dotted lines in FIG. 1, each publisher, subscriber, and hub can be located in separate computers (102, 104, and 106), in the same computer (108, 110, and 112) or in some combination of separate computers and the same computer (114, 116, and 118). Hubs can have zero or more publishers and zero or more subscribers. Hubs can also be directly connected to other hubs.

It will be understood by persons of ordinary skill in the art that each computer (represented in FIG. 1 by dotted lines) includes a CPU, a memory, and input/output lines. These elements are not shown in the figure for the sake of clarity of example. Each computer can also include numerous other elements, such as disk drives, keyboards, display devices, network connections, additional memory, additional CPUs, etc. The publishers, subscribers, and hubs preferably are implemented as software instructions stored in a memory and executed by a processor of a computer system. Usually, the publisher, subscriber, and hub software is executed by a processor of the computer in which the software is stored, although a processor of another computer system could also execute the software.

A preferred embodiment of the invention runs under the Solaris operating system, Version 2.4. Solaris is a trademark of a registered trademark of Sun Microsystems, Inc. in the United States and other countries and is based on the Unix operating system. Unix is a registered trademark in the United States and other countries, exclusively licensed through X/OPEN, Ltd. Networked computer system 100 uses a network communication protocol, such as TCP/IP, although any appropriate protocol can be used to implement the present invention In the described embodiment, a "publisher" publishes events of certain types on the network 120 and a "subscriber" subscribes to events of certain types. The publisher and subscriber operate asynchronously and are unaware of each other's existence. Use of a "publish and subscribe" model insulates applications from the network and from each other. Publishing can be thought of as broadcasting an event. The event type is analogous to a radio station. Applications interested in a particular station subscribe (or tune in to) a specific event type. Just as in radio broadcasting, where all parties involved must agree in advance on a set of possible frequencies, applications in the described embodiment must agree in advance on a predetermined set of event types.

The described embodiment of the present invention uses "subscription by content." Subscribers specify what they want based on an event type and on the content of the event. The described embodiment makes use of "store and forward" techniques for events. This term means that the system buffers event, so that, even if a publisher is off-line, a subscriber can still retrieve events. Similarly, a publisher can publish events even if a subscriber is off-line.

The described embodiment is managed in units of hubs. A hub, such as hub 106, is a local connection point for a publisher and/or a subscriber. Both publishers and subscribers are called "clients" of hubs. A publisher uses an "advertisement" to tell the system what types of events it intends to publish and how it intends to publish them (e.g., daily, as each event trigger occurs, etc). Advertisements are registered with the hub connected to the publisher during the installation of the publisher. An advertisement must have a unique name. In addition to containing a name of an event type to be published, an advertisement contains other information about the publisher. This information can include the priority level for the published events, for how long the events are valid, etc. Hubs transmit advertisements to all potential subscribers. Hubs transmit published events to all subscribers who have subscribed to events of that type, whose content matches the subscriber's subscription.

II. Publishers and Subscribers

The following paragraphs describe the steps required to create an application (either a publisher or a subscriber) and to install it on a hub. The following paragraphs further describe the steps performed by an example publisher to publish events and by an example subscriber to subscribe to events. The described embodiment allows a programmer to write software for applications (publishers and subscribers) in a high level language and to interface with the hub using routines defined in an API and using event manipulation routines generated for each user-defined event type.

Figure 2:
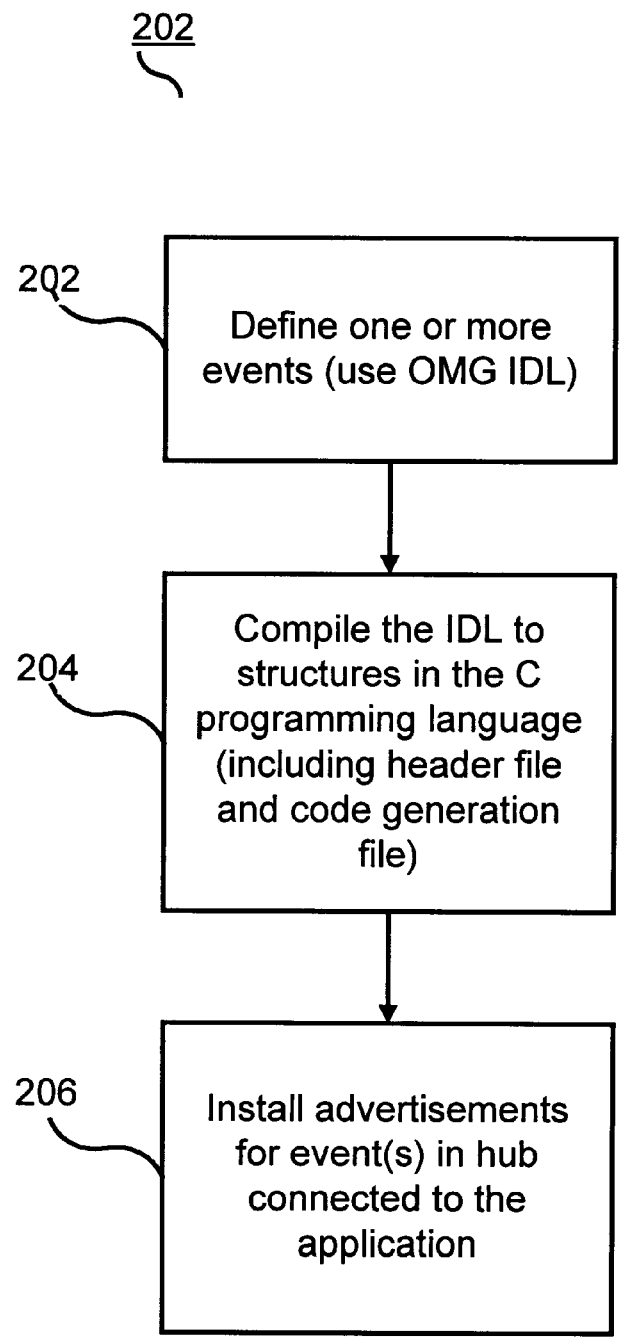
FIG. 2 is a flow chart showing steps performed to install an application, such as a publisher, on a hub of FIG. 1.
Figure 3:
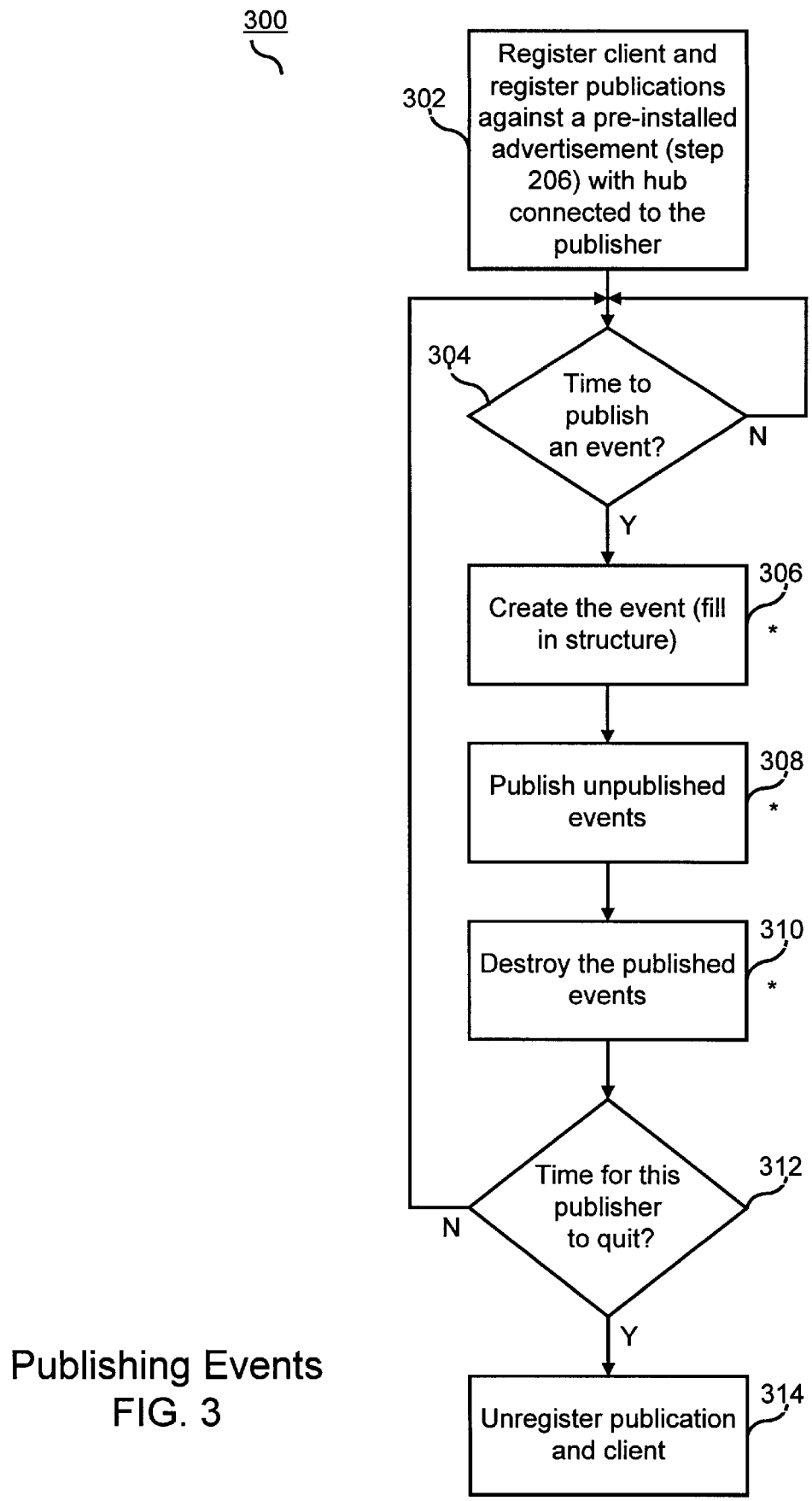
FIG. 3 is a flow chart showing steps performed by a publisher of FIG. 1 to publish events.
Figure 4:
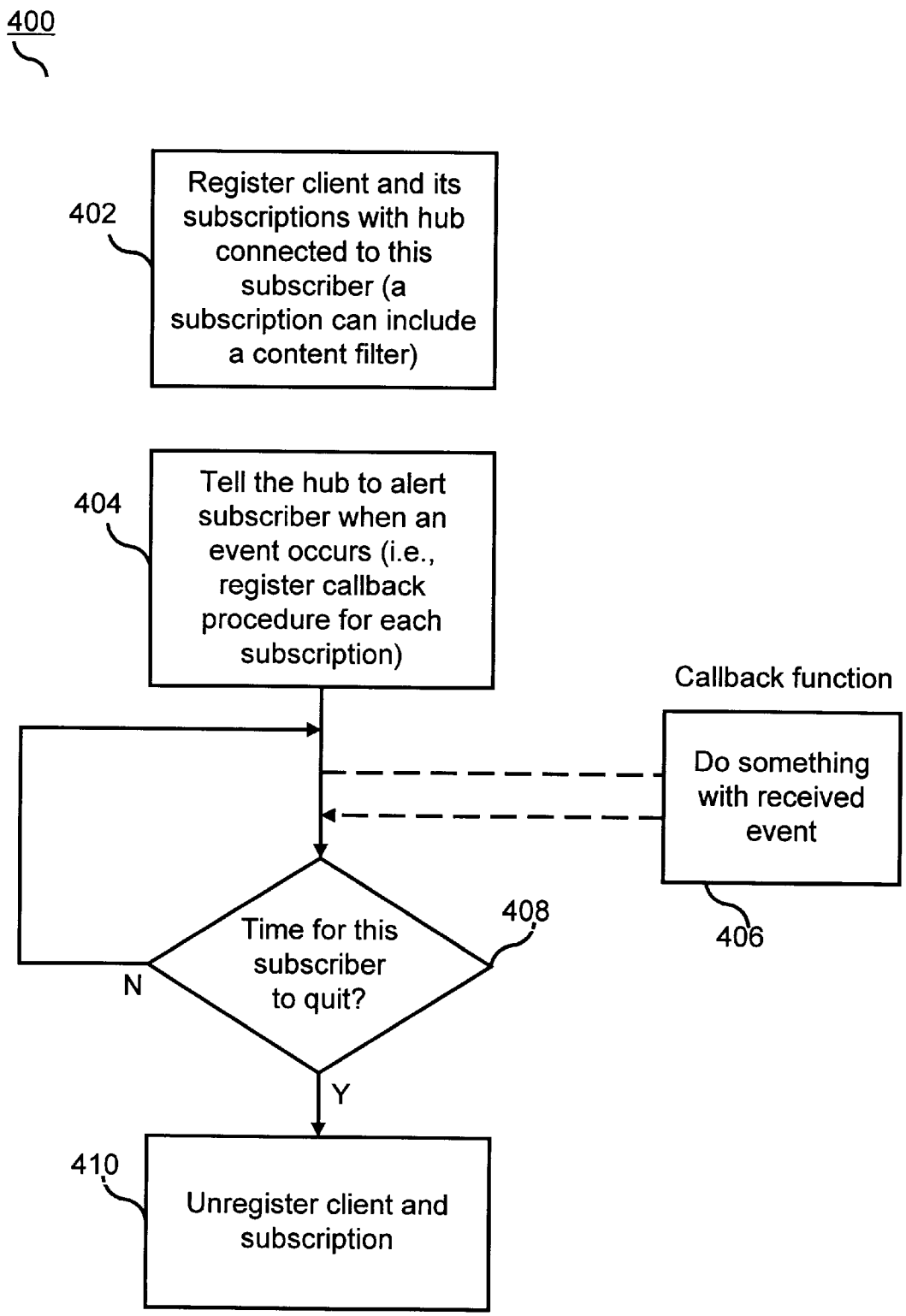
FIG. 4 is a flow chart showing steps performed by a subscriber of FIG. 1 to subscribe to events.

FIG. 2 is a flow chart showing steps performed to install an application, e.g., a publisher, on a hub. FIG. 3 is a flow chart showing steps performed by an installed publisher to publish an event. FIG. 4 is a flow chart showing steps performed by a subscriber of FIG. 1 to subscribe to events of a certain type and content. As discussed above, both publishers and subscribers preferably are implemented as software programs executed by a processor.

The described embodiment is centered around the sending (publication) and receiving (subscribing) of events. Before a publisher can publish events, the publisher must define and advertise the events that it will publish. In order for the events to make sense, publishers and subscribers need to understand each other. For this reason, the described embodiment uses a standard specification language to define events. In step 202 of FIG. 2, the publisher defines one or more events that can be published by that publisher. The described embodiment of the described embodiment allows definition of events using an industry standard Interface Definition Language (IDL). IDL is a standard interface propagated by the Object Management Group (OMG), although any applicable syntax for describing the structure of the event could be used in conjunction with the described embodiment. In step 204, the OMG IDL definitions of the events are translated into data structures in the C programming language.

Assume, for example, that an application publishes "SalesOrder" events. Before the application could be added to the system, and assuming that no other applications dealing with SalesOrder events already existed, a programmer would define a "SalesOrder" event using OMG IDL as follows:

```
//filename: order:ddl
interface SalesOrder {
    struct Address {
        string street;
        string city;
        string state;
        unsigned long zip;
    };
    attribute string customer_name;
    attribute Address customer_address;
};
```

The above syntax defines an event as an "interface" and defines the data members in the event as "attributes."

After one or more events have been defined, the events are translated into structure definitions of the C programming language. Preferably, this translation is performed by an OMG IDL compiler, which generates a header file and a code file for each event. The generated header file contains simple C-language structures that represent the event declarations for the typed functions defined in the code file. The C structure definition generated for the above example event of type SalesOrder is:

```
typedef struct SalesOrder_Address {
    nxsString street;
    nxsString city;
    nxsString state;
    nxsULong zip;
} SalesOrder_Address;
typedef struct SalesOrder {
    nxsString customer_name;
    SalesOrder_address customer_address;
} SalesOrder;
```

A person of ordinary skill in the art will easily understand how the IDL of the example translates into the C programming language structure definitions shown above.

The code file generated from the event definition contains procedures for manipulating events of the defined type (here, for the SalesOrder event). The procedures perform at least the following operations:

For use by a publisher:
  Create event of type SalesOrder,
  Publish event of type SalesOrder,
  Destroy event of type SalesOrder
For use by a subscriber:
  Print contents of event of type SalesOrder,
  Register Subscription for event of type SalesOrder, A person of ordinary skill in the art will understand that, although the above plurality of procedures is generated for each defined event, the operation of the procedures differ due to the differences in the structures of the event. The procedures also differ due to the fact that the described embodiment uses typed function to prevent programming errors.

The process of installing a process application in a hub includes storing one or more advertisements in the hub, as shown in step 206. These advertisements define types of events that the hub knows about. An advertisement includes the name of the advertisement, a description of the event that a publisher publishes (e.g., a SalesOrder event), a description of how the publisher publishes its events (e.g., daily, when an event trigger occurs, etc.), the name of the event type, the priority level of the events, and the expiration time on the events (also called "time-to-live"). Although not shown in the Figure, the described embodiment also allows access control permissions for the various event types to be set.

The described embodiment also includes predefined routines in an API, which are available to the publisher and subscriber software and which include routines to perform at least the following functions:

Register a client,

Reestablish a client with an existing session,

Unregister a client,

Registering intent to publish,

Unregistering a publication,

Publishing an event,

Subscribing to an event,

Reactivating an active subscription to an event, and

Figure 8:
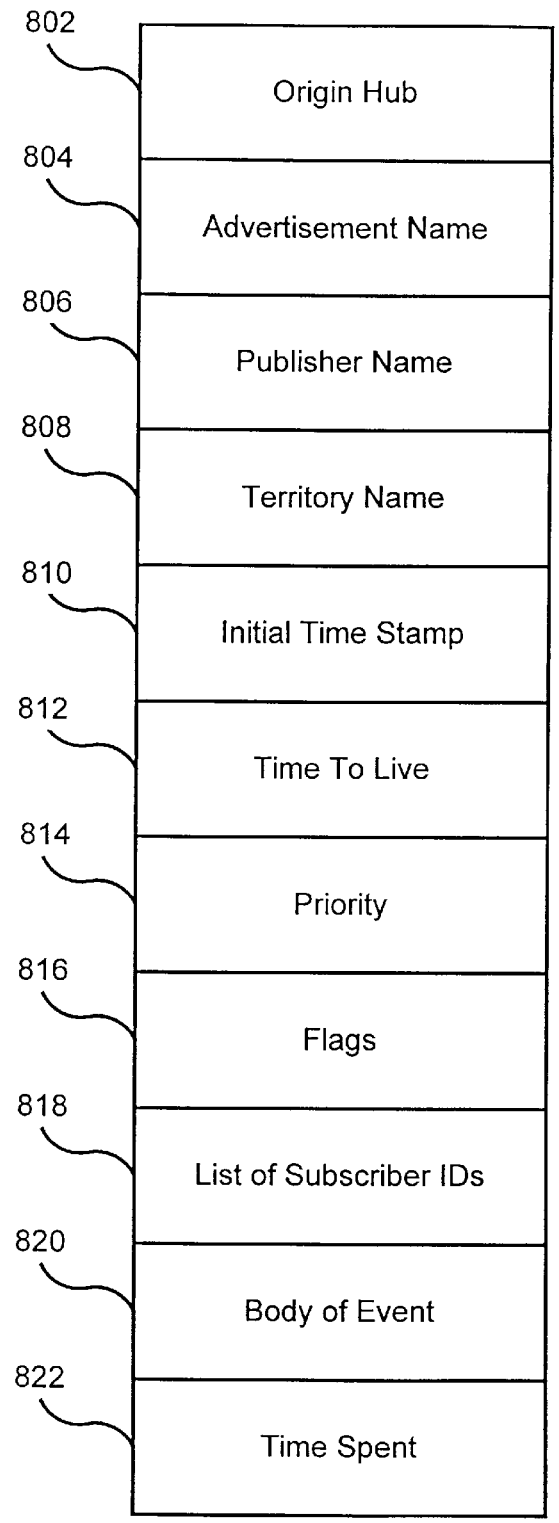
FIG. 8 shows a format of an envelope data structure of an event.

Cancelling a subscription,

Other APIs in accordance with the present invention may include somewhat different API functions. In addition, the API preferably includes a "can_subscribe" routine and a "can_publish" routine that return a Boolean value indicating whether the calling application can subscribe to or publish events of a certain type. The API also includes a "get_current_envelope" routine that returns information about the publisher of an event and how the event was published. (This routine can only be called from the call-back procedure). A call-back procedure is called, e.g., when a subscriber receives an event. FIG. 8 shows a format of an envelope data structure for an event, which is discussed below in connection with event routing.

It will be understood that when the event description for a publisher or a subscriber is initially translated into, e.g., C, the event header file, whose generation is discussed above, is included within the application software source code. Thus, in the example, the publisher has access to the definition of the SalesOrder event. The translation also links the event manipulation routines and API routines into the application at this time. The hub, along with other hubs, transmits a notice of the advertisement existence to potential subscribers, as discussed below.

Once a publisher is installed in a hub, it is free to publish advertisements and events. FIG. 3 is a flow chart showing steps performed by a publisher of FIG. 1 during operation of the publisher. Steps involving a call to the event manipulation routines that are created by compiling the IDL are indicated by an asterisk in the Figure.

As shown in step 302 of FIG. 3, the publisher first registers itself as a client with the hub to which it is connected. The publisher next advises the hub of which "advertisement" it will use when publishing. An advertisement represents an "intent to publish" and tells the hub what type of event the publisher will be publishing. To advise the hub in step 302, the publisher tells the hub the name of an advertisement that has been previously installed in the hub (see FIG. 2).

In step 304, the publisher waits until it is time to publish an event. Some publishers, such as in the example above, publish each event at the time that it occurs. Other publishers wait until a specified time, such as once a day, and publish all unpublished events at that time. For example, a first publisher may publish an event whenever a human operator enters a sales order into the system. A second publisher may publish the same type of event on an hourly basis. Once the publisher determines that an event is to be created, it calls (in step 306) one of the event manipulation routines that creates a C structure having the proper format for the event to be published.

In step 308, the publisher calls one of the event manipulation routines to publish unpublished events as discussed below in more detail. In step 310, the publisher calls one of the event manipulation routines to destroy the published event. (In general, in the described embodiment, whatever entity is responsible for allocating an event is also responsible for destroying that event.)

In step 312, the publisher determines if it should cease execution. If not, control returns to step 304. If so, in step 314, the publisher unregisters itself with the hub and ceases execution. Advertisements are kept in the hub to indicate that a publisher could execute and send those events. This information is needed to build routes to subscribers, as described below. Although not shown in the Figure, other publishers connected to the same hub may operate asynchronously with the steps of FIG. 3.

Subscribers subscribe to events of particular event types. FIG. 4 is a flow chart showing steps performed by a subscriber of FIG. 1 during operation of the subscriber. The subscriber first registers itself as a client of the hub. Then for each subscription, it registers a "call-back" procedure.

As shown in step 402, the subscriber next registers itself as a client with the hub to which it is connected. The subscriber then registers a "subscription" for the event type that it wishes to receive through the hub. (The subscriber can look at the hub to see what types of events are advertised.) A subscription specifies a type of event, and can further specify a "filter" indicating that the subscriber wishes to receive only events of a certain type that also have certain values in certain fields.

In step 404, for each subscription, the publisher defines a predetermined "call-back" procedure. The call-back procedure will be initiated by the hub whenever the hub determines that the subscriber has received an event of a certain type. The format of the callback may be different for each operating system on which the present invention is implemented and the call-back procedure can be practically any procedure that is performed when an event is received. For example, in step 406 of FIG. 4, the call-back procedure could print the contents of the event (using one of the event manipulation procedures designed to print an event of that type). Because a call-back procedure is defined for each subscription, a call-back procedure must be defined for each type of event to which the subscriber plans to subscribe. In the described embodiment, an event passed into a call-back procedure is destroyed when the call-back procedure returns. Thus, if the subscriber wants to keep any information of the event, the information should be copied out of the event within the call-back procedure.

The subscriber loops until it is time to cease execution (see step 408). The call-back procedure may be activated zero, one, or many times during this loop, as events of the specified type and values are received by the hub. If an event subscribed to by the subscriber is received, the call-back procedures is executed in step 406. If, in step 408, the subscriber determines that it is time for it to quit, the subscriber optionally unregisters its subscription, unregisters itself with the hub, and ceases execution. Subscriptions can also be retained in the hub, to receive future events while disconnected. The hub will queue events arriving for the subscriptions. Although not shown in the Figure, other subscribers connected to the same hub may perform steps asynchronously with the steps of FIG. 4.

The following examples are written in the C programming language and show example software for a publisher and subscriber.

```
/*
* publish.c
*/
#include <nexus.h>
#include "nxs_output/order_nxs.h"
int main()
{
  SalesOrder *event;
  nxsClientID id;
  nxsPublicationID pub_id;
  /* Register the Client and the publication */
  nxsCreateClient ("order publisher", NULL,NULL, 0, &id);
  nxsRegisterPublication (id, "order_advertisement", &pub_id);
  /* Create the event */
  event = nxsCreate_SalesOrder();
  event->customer_name = "Jim Nexus";
  event->customer_address.street = "12345 Anistreet";
  event->customer_address.city = "Mountain View";
  event->customer_address.state = "CA";
  event->customer_address.zip = "95000";
  /* Publish Event */
  nxsPublish_SalesOrder (id,pub_id,event,0,0);
  /* Clean up */
  nxsDestroy_SalesOrder(event);
  /* Unregister the publication and client */
  nxsUnregisterPublication (id,pub_id);
  nxsDestroyClient (id);
  return(0);
}
/*
* subscribe.c
*/
#include <nexus.h>
#include "nxs_output/order_nxs.h"
/* Callback function to be called when each event is received */
void event_callback (
    nxsClientID id,
    nxsSubscriptionID sub_id,
    nsxULong seq_num_high,
    nsxULong seq_num_low,
    SalesOrder *the_event,
    void *client_data)
{
  char *st;
  printf("Event received!\n");
  st = nxsStringify_SalesOrder(the_event);
  printf(st);
  free(st);
}
int main(int argc, char **argv)
{
  Sales Order *event;
  nxsClient ID id;
  nxsSubscriptionID sub_id;
  /* Register Client and subscription */
  /* (Only subscribe to specific ZIP codes) */
  nxsCreateClient ("order subscriber",NULL,NULL,0,&id);
  nxsRegisterSubscription SalesOrder(id,
      "customer_address.zip == 95000",
      event_callback,NULL_&sub_id);
  /* Main.loop */
  nxsMainLoop(id);
  /* Unregister subscription and client */
  nxsUnregister Subscription(id,sub_id);
  nxsDestroyClient(id);
  return(0);
}
```

III. Hubs

Figure 5:
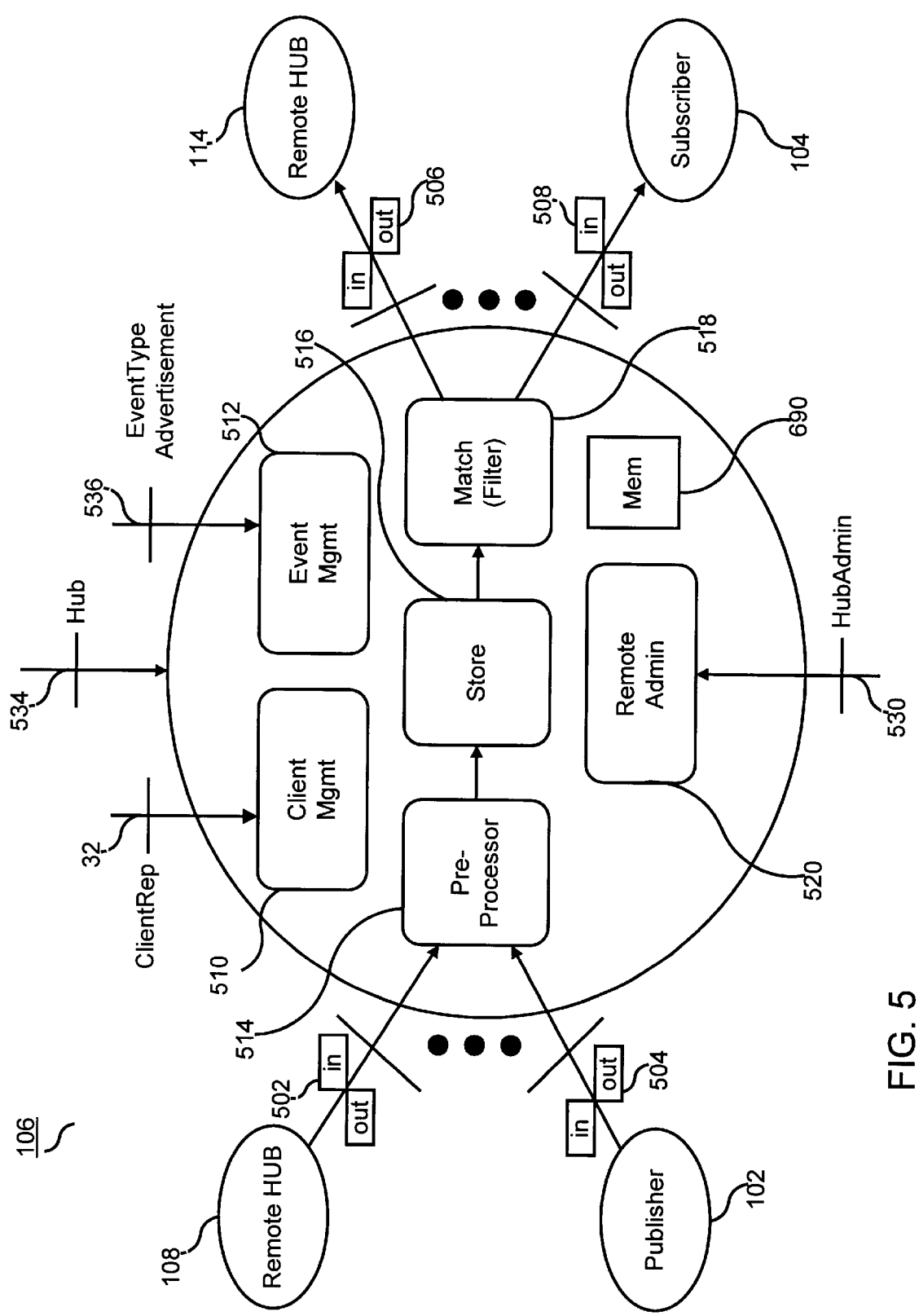
FIG. 5 is a block diagram showing details of a hub of FIG. 1.

FIG. 5 is a block diagram showing details of hub 106 of FIG. 1. Hubs 108 and 114 of FIG. 1, and indeed all other hubs in the described embodiment, have a similar structure. Hub 106 is connected to remote hubs 108 and 114 via network 120 (or directly) and to zero or more publishers 102 and zero or more subscribers 104. Hub 106 also receives information 530 relating to hub administration, information 532 relating to management of its clients (publishers and subscribers), and information 536 relating to system event management.

All input and output to and from hub 106 is queued. For example, events received by hub 106 from remote hub 108 and from publisher 102 are stored in event priority order in respective event queues 502, 504 until hub 106 has time to process them. As a further example, events to be sent by hub 106 to remote hub 114 and to subscriber 104 are stored in event priority order in respective event queues 506, 508 in memory until hub 106 has time to send them. Hubs distribute events using a first-in, first-out policy. This means that all events having a same priority level will be delivered by hub 106 in the order that they are accepted from the publisher. All events with a higher priority level are delivered earlier than waiting events with a lower priority level. The described embodiment guarantees to keep the ordering of like-events from a single publisher as the events move though the system. This is important, for example, in transaction processing where an order of updates must be maintained. Inter-publisher ordering is not guaranteed, since it depends on routing and availability issues.

FIG. 5 also shows the following functional blocks inside hub 106: client management block 510, event management block 512, preprocessor block 514, store block 516, match block 518, and remote administration block 520. Client management block 510 deals with registering and unregistering clients. Event management block 512 deals with managing system events, such as receipt of new connections, types, routings, advertisements, and subscriptions. Pre-process block 514 performs tasks such as adding envelope information to an event. Store block 516 is a memory of the hub. Match block 518 adds routing information to events, filters events in a manner described below in connection with event routing, and routes events to appropriate other connected hubs. Remote administration block 520 performs system administration tasks.

FIG. 7 is a diagram of data structures stored in a memory 690 of hub 106 of FIG. 1 that is accessible by all the functional blocks of FIG. 5. The data structures include a table of installed advertisements 700, a table of registered clients 730, a table of registered publications 760, and a table of registered subscriptions 770. Data is placed in the data structures of FIG. 7 as the publisher and subscriber perform the various steps of FIGS. 2, 3, and 4 as follows.

Step 202 of FIG. 2 fills entries of installed advertisements table 700.

Steps 302 and 402 of FIGS. 3 and 4 fill entries of registered clients table 730. The user name field 734 and user password field 736 may have a NULL value to indicate that the current user ID should be used. Hub name 737 and territory name 740 can be set to NULL to indicate use of a default hub and territory. Flags 742 include, for example, a Boolean value "call-back-on-any-thread," which indicates that event call-backs come on new threads.

Step 302 of FIG. 3 also fills entries of registered publications table 760.

Advertisement name 764 is the name of an advertisement that has been installed in the hub. Step 404 of FIG. 4 also fills entries of registered subscriptions table 770. Content filters 774 are discussed below. A name of a callback procedure is kept locally in the subscriber (by the C API). The API finds the callback from the subscription ID. A client data field, which is also kept by the API, allows information associated with the subscription to be passed back with each event callback. The information that is passed back has meaning to the subscribing application.

The following paragraphs describe the various types of content filters that can be specified by a subscriber when it registers a subscription. As shown in the above example, subscribers can request that the hub filter the incoming flow of events and only pass events to the subscribers that match certain criteria. A filter preferably is specified as a expression string sent by the subscriber as a parameter to the routine for registering subscriptions. The expression string syntax for a content filter in the described embodiment is as follows. (Of course, any appropriate syntax could be used):

| symbol | meaning | types allowed for |
| --- | --- | --- |
| = | equal to | all basic types |
| != | not equal to | all basic types |
| > | greater than | numeric and string types |
| >=, <= | greater than or equal | numeric and string types |
| and | logical AND | expressions or Booleans |
| or | logical OR | expressions or Booleans |
| not | logical NOT | expressions or Booleans |

Event attribute names are used to denote which field in the event should be compared. Sub-fields (those inside structures) are specified using dot notation. Names can also be enumerated types, as is known to persons familiar with the C programming language. Once a content filter has been specified, it is used during event routing as described below in connection with FIGS. 8–12. Information describing each content filter for a subscription is stored in field 774 of FIG. 7.

Figure 6A:
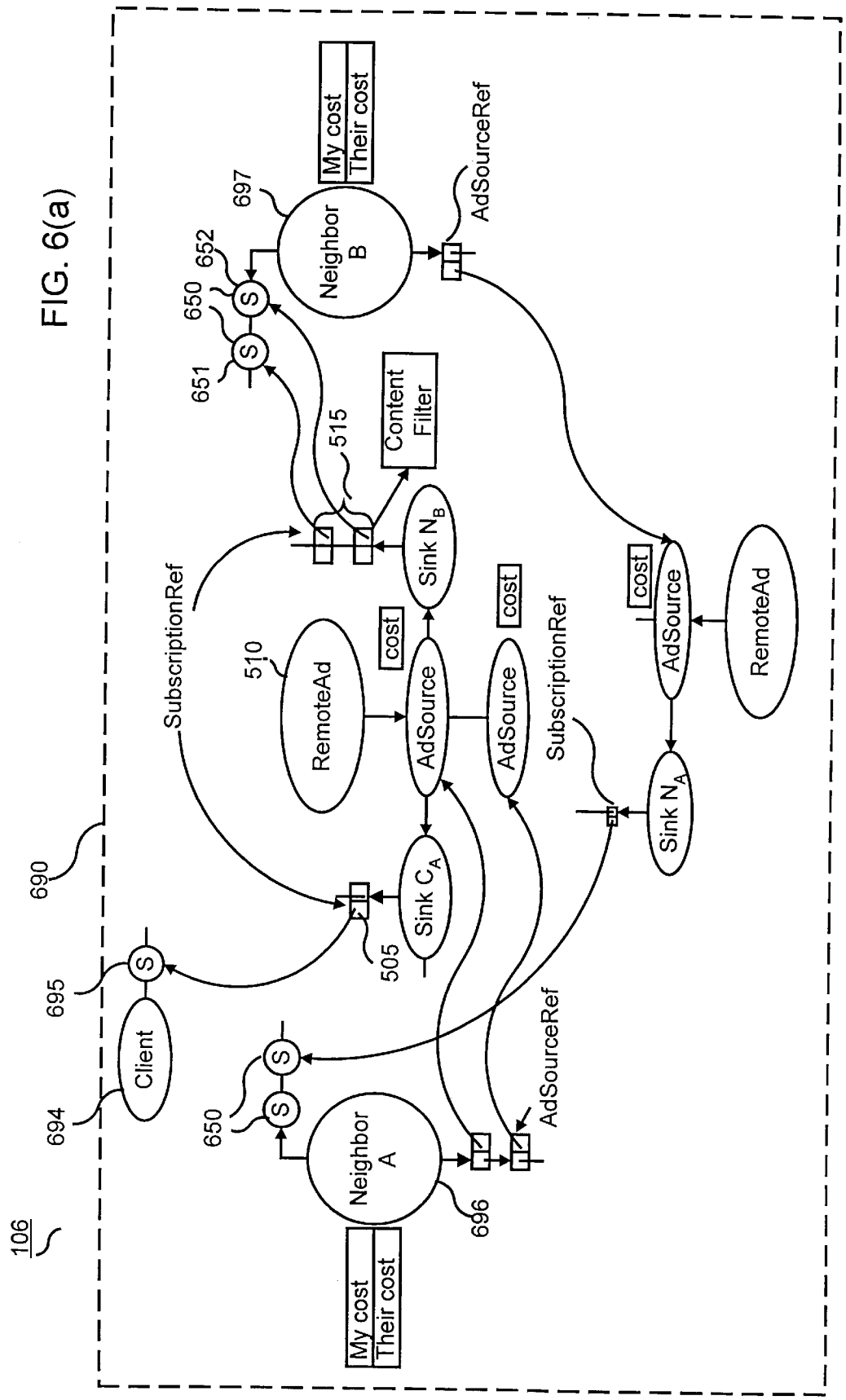
FIG. 6(a) is a diagram showing data structures stored in a memory of the hub of FIG. 5.
Figure 10:
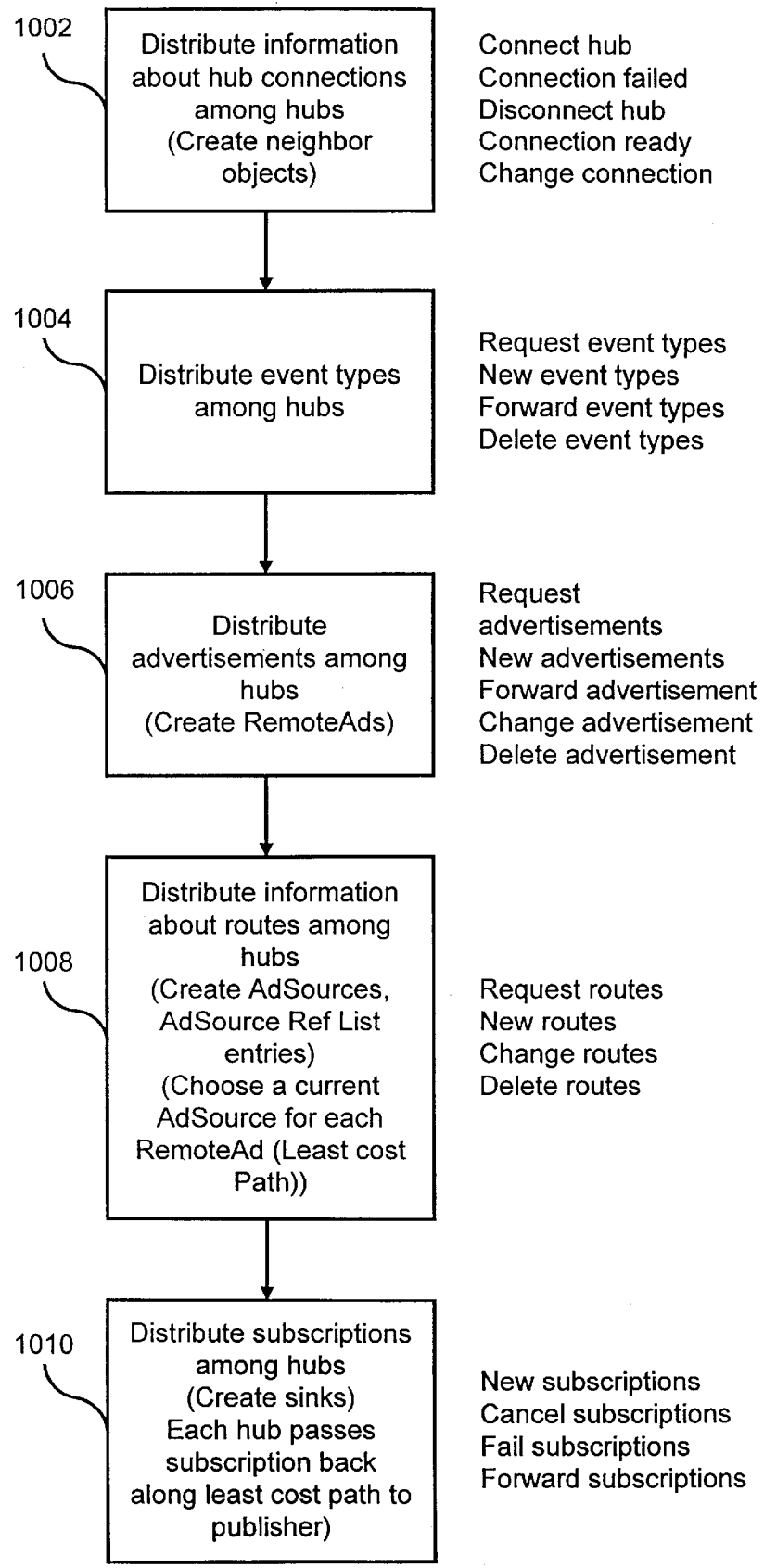
FIG. 10 is a flow chart showing details of steps performed by the hubs of FIG. 1 to populate the data structures of FIG. 6(a).
Figure 11:
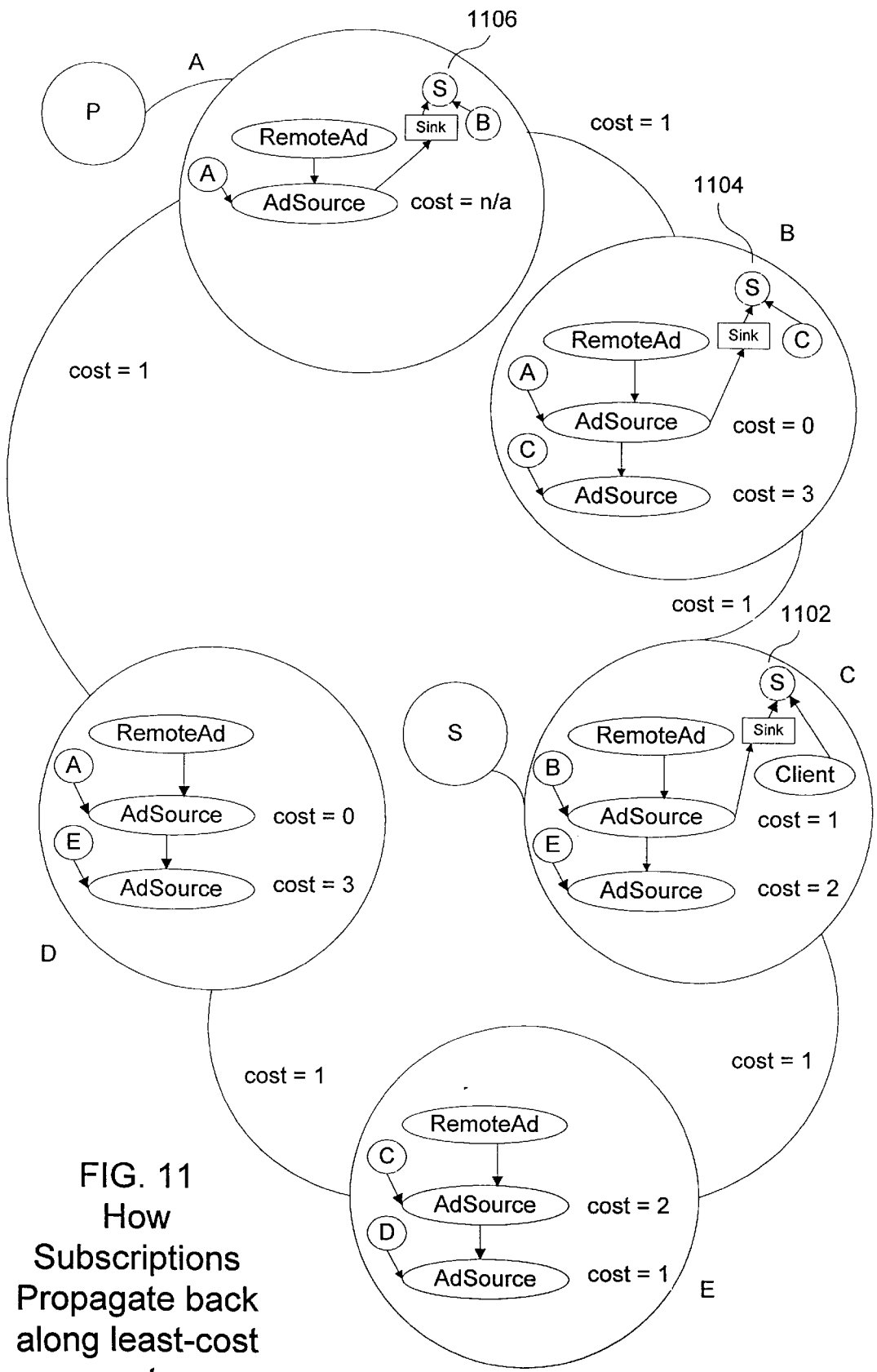
FIG. 11 is a diagram showing examples of the data structures of FIG. 6(a) populated with data.
Figure 12:
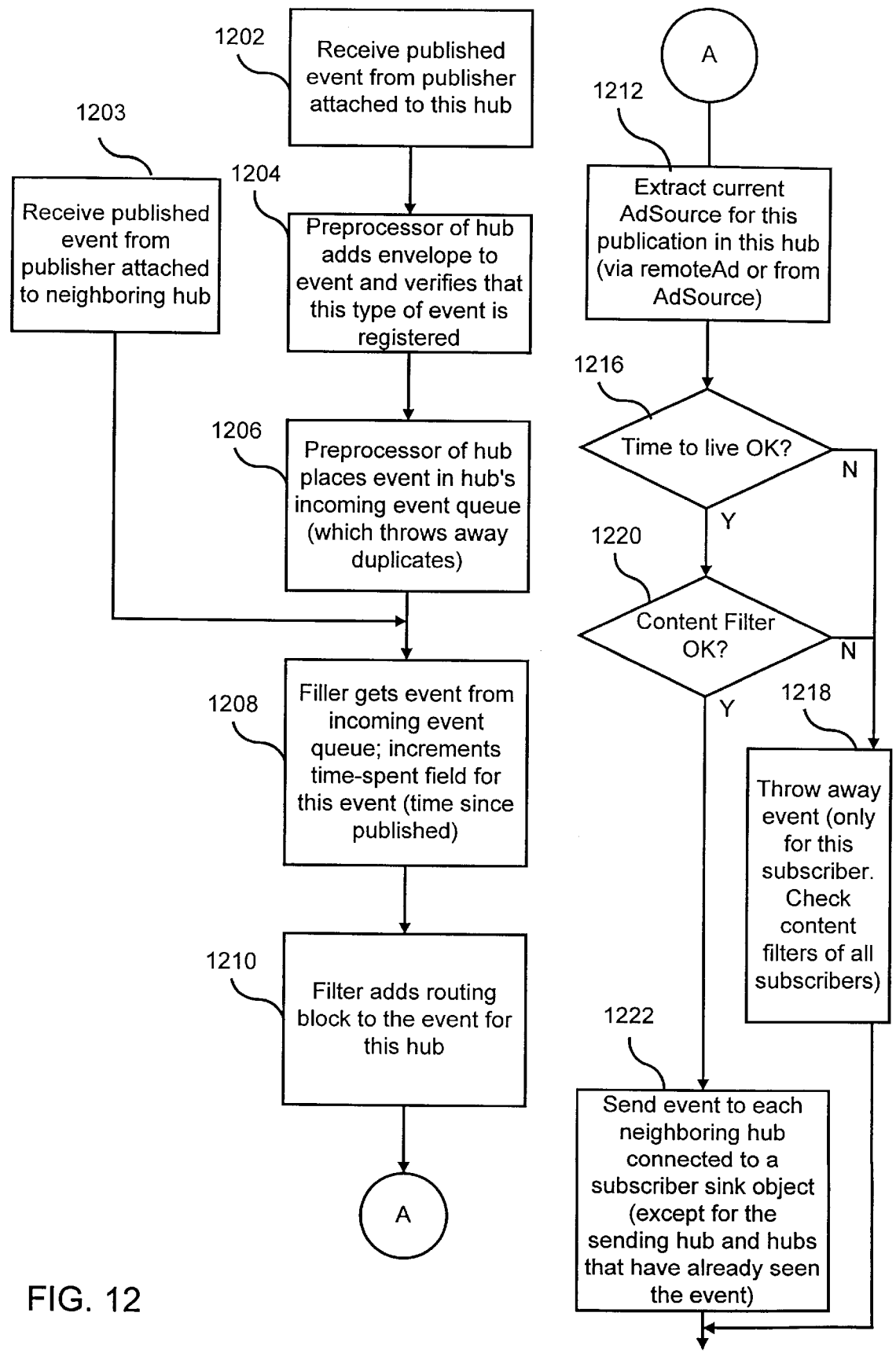
FIG. 12 is a flow chart showing details of steps performed by the hubs of FIG. 1 to send published events to subscribers.

FIG. 6(*a*) is a diagram showing data structures stored in a memory 690 of hub 106 of FIG. 5. All hubs contain similar data structures. The described implementation uses a distributed objects model, but any appropriate organizational structure could be used. Details of the data structures of FIG. 6(*a*) are listed in FIG. 6(*b*). Ideally, the data structures of FIG. 6(*a*) describe all advertisements in the system and indicates a neighbor hub to which the current hub should send events of certain types. FIGS. 10 and 12, respectively, describe the steps to populate the data structures of FIG. 6(*a*) and to use to the data structures of FIG. 6(*a*) to route events among the hubs. FIG. 11 shows an example of the data structures populated with data.

Hub 106 (the "current hub") includes data objects representing: each client of the current hub that is a subscriber (indicated by "Client" 684 and "S" 695) and each neighboring hub connected to the current hub ("Neighbor A" 696 and "Neighbor B" 697). The current hub keeps track of the subscription objects of its neighbor hubs. Subscription objects "S" 650 represent all subscribers that can be reached through the respective neighbors. Each neighbor object has two associated cost values: "mycost" and "theircost". "Mycost" represents a cost of sending information from the current hub to the neighbor. "Theircost" represents a cost of sending information from the neighbor to the current hub. "Theircost" used to define a route, as described below. The subscribing hub will ask the "publishing" hub with the lowest "theircost" to forward the events. "Mycost" preferably is only used to inform the neighbors of how much it would cost to the current hub to send information through that link. A "cost" may be figured in a number of ways. For example, a cost may represent a financial cost, a cost in units of time, a cost as a measure of convenience, or any other appropriate cost.

Hub 106 contains a ("RemoteAd") object for each advertisement that has been registered in the system (i.e., for each intent to publish, step 202 of FIG. 2). Each RemoteAd object points to one or more "AdSource" objects, each of which represents a path between the current hub and the hub on which the publisher of the ad resides. Each AdSource object stores a cost associated with its path to the original publisher of the ad. Thus, the "cost" value for each AdSource contains the total cost for sending an event from its source to the neighbor of the current hub or, alternately, to the current hub.

Each AdSource object has an associated list of "sink objects." (SinkCa and sinkNb preferably are located in a single list, although not shown that way in the Figure.) Each sink object has an associated list of subscriptions. For example, SinkCa has a list 505 of all subscriptions of Client 694 that matched to the advertisement of RemoteAd 510. Similarly, SinkNb has a list 515 of all subscriptions of Neighbor B (and of all subscriptions that can be reached through Neighbor B) that have matched the advertisement of RemoteAd 510.

Each neighbor object also has an associated AdSourceRef list that points to AdSources for all paths between a publisher and the neighbor. The paths are used for routing system events between hubs, as described below.

IV. Event Routing Between Hubs

FIG. 10 is a flow chart showing details of steps performed by hubs 106, 108, and 114 of FIG. 1 to populate the data structures of FIG. 6(*a*). These steps are performed, for example, when the network is first initialized. Subsequently, various hubs may issue "system events" to tell other hubs that changes have occurred in hub connections, event types, advertisements, routings, subscriptions, etc. Appendix A, which is a part of this specification and is herein incorporated by reference, contains a summary of exemplary system events that can be passed between hubs in the described embodiment.

In FIG. 10, the name of the system event of Appendix A that affects a step in the flow chart is shown next to the step. In step 1002, hubs send system events to each other to define the physical connections between hubs in the network. Each hub creates neighbor objects representing physical connections to its neighbor hubs (see FIG. 6(*a*)). In step 1004, the hubs send system events to each other to define the types of events for which advertisements can be published. Each hub makes sure it knows all the events. This step is performed when adding a hub to a territory. In step 1006, hubs that are connected to a publisher send system events to other hubs, which are forwarded among the hubs, to distribute advertisements among the hub. For example, the system event NXS_SYS_EVENT_CREATE_NEW_ADVERTISEMENT of Appendix A causes the creation of RemoteAd objects in the hubs (see FIG. 6(*a*)).

In step 1008, hubs that are connected to a publisher send system events to other hubs. The system events are forwarded among the hubs to determine routes from the publisher's hub to other hubs. (The system event NXS_SYS_EVENT_NEW_ROUTES causes the creation of AdSource objects in the hubs (see FIG. 6(*a*)). To register the existence of a route, an initial hub sends a system event to its neighbors, containing an advertisement name/ID, its (the publishing hub's) name and territory, and a cost associated with sending an event from the publishing hub to the current hub. In the described implementation, the cost is initially set to zero. Each neighbor hub repeats this process, adding the cost of the connection over which that hub received the event. In each hub, if this is the first route to the hub, then the local clients are checked for subscription matches (This action may result in a NEW_SUBSCRIPTION system event to the sender of NEW_ROUTES). Each route is considered separately for forwarding. The route is not forwarded to the hub from which it was received, to the originating hub, or to a hub that has already seen the event (determined from the routing list, as discussed below). The route is only forwarded to other hubs if it is the fir st route for the RemoteAd or if it is the second route and the destination hub is the current route provider.

In step 1010, hubs connected to a subscriber s end system events to other hubs to register a subscription against an advertisement known about by the other hubs. (The system event NXS_SYS_EVENT_NEW_SUBSCRIPTIONS sends subscriptions to other hubs, see FIG. 6(*a*)). A hub receiving the system event creates a subscription object (see FIG. 6(a)) and tells the RemoteAd a bout it. An AdSource having a least-cost path is called the current AdSource. The RemoteAd tells the current AdSource, which creates a sink and a subscription object of the Neighbor object (if a sink and a subscription object do not exist). The sink then adds a SubscriptionRef entry (e.g., 505, 512) fo r the subscription object. If the advertisement was received from another hub, the current hub forwards a system event for the new subscription to the neighbor that is a part of the current least-cost route.

This forwarding of subscriptions to other hubs is an important aspect of the present invention. It essentially creates a chain of subscriptions from a hub of a subscriber back to the hub of the publisher. This chain follows the least-cost route between the publisher and the subscriber.

FIG. 11 shows an example of the creation of a chain of subscriptions from a hub of a subscriber to a hub of a publisher. FIG. 11 shows five hubs A, B, C, D, and E. Hub A has a connected publisher P. Hub C has a connected subscriber S. In the example, each connection has a cost of "1". Thus, for example, there is a route of total cost=2 between hub A and C and a route of total cost=3 between hub A and C.

FIG. 11 shows the status of the hubs after step 1010 of FIG. 10. Connections, event types, and routes have been distributed among the hubs and the RemoteAd, AdSource, Neighbor, and AdSourceRef objects have been created in each hub.

In the example, subscriber S registers a subscription on hub C. (Hub C had previously created a subscription object 1102 when S registered itself as a client, indicating that the subscriber S is a client of hub C). Hub C then routes a "new subscription system event" (a "subscription") to a neighbor hub that is on a least-cost path to the publisher of the advertisement for the event. In the example, hub C will route the subscription to hub B, since the cost from hub B to the publisher hub A is "1". When hub B receives the subscription, it adds a subscription object 1104 connected to a neighbor object for hub C, indicating that the subscriber can be reached through hub C.

Hub B then routes a subscription to a neighbor hub that is on a least-cost path to the publisher of the advertisement for the event. In the example, hub B will route the subscription to hub A, since the cost from hub A to itself is "0". When hub A receives the subscription, it creates a subscription object 1106 connected to a neighbor object for hub B, indicating that the subscriber can be reached through hub B. Hub A does not route the subscription further, since it is the originating hub for the advertisement that is being subscribed to.

Once the data structures of FIG. 11 have been established, an event published by publisher P will be sent hub-to-hub along the path defined by the subscription objects 1106, 1104, and 1102 until it reaches subscriber S.

FIG. 12 is a flow chart showing details of steps performed by the hubs of FIG. 1 to send published events to subscribers by routing the events through the hubs of the system. The steps of FIG. 12 are performed by 1) a hub that receives an event from its connected publisher (step 1202) or 2) a hub that receives an event from a neighboring hub (step 1203). The steps of FIG. 12 are performed by various hubs as each event is routed through the system. In the following paragraphs, the hub performing the steps of FIG. 12 is termed the "current hub."

If the current hub receives an event from one of its connected publishers (step 1202), the preprocessor 514 of the current hub initially adds an "envelope" to the event (step 1204). A format of an event envelope is described below in connection with FIG. 8. Preprocessor 514 then determines in step 1204 whether the event type of the event is registered in the hub. If not, the publisher cannot publish the event. If so, in step 1206, the hub places the event in the hub's incoming event queue for further processing. In the described embodiment, the event queue discards duplicate events (as determined by a sequence number or time stamp of the event envelope).

If the current hub receives the event from a neighboring hub (step 1203), the neighboring hub places the event in the incoming event queue of the current hub.

Figure 9:
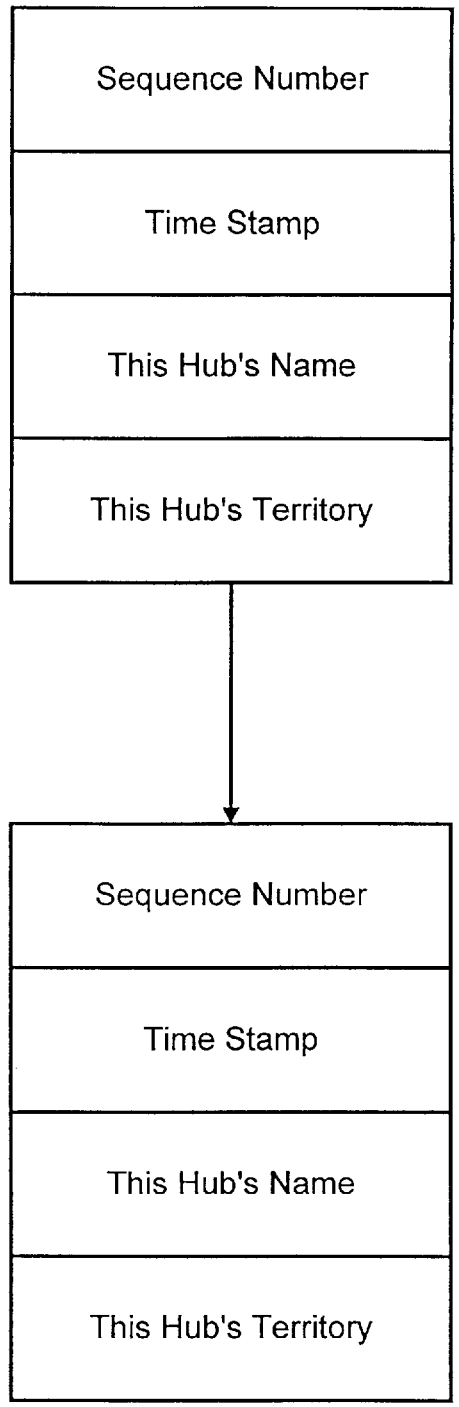
FIG. 9 shows a format of a routing block of an event.

In step 1208, filter 518 of the current hub gets the event from the current hub's incoming event queue. Filter 518 then increments the time-spent field of the envelope, which indicates an amount of time spent in queue. In step 1210, filter 518 adds a routing block to the event. Each hub that routes the event adds another routing block to the event. A format of two routing blocks is shown in FIG. 9.

In step 1212, the current hub locates a "current" AdSource object that represents all the subscribers which are interested in the event coming from that particular AdSource. This will usually represent a least a cost path between the current hub and the subscribers, (note that the described embodiment does not reroute once an AdSource data structure is established. The AdSource object is located by either searching all RemoteAds for the current hub (if the event came from a publisher attached to the current hub) or from searching the AdSourceRef list for the neighboring hub (if the event came from a neighboring hub). Steps 1216–1222 send the event to one or more subscribers. Steps 1216–1222 are performed for each sink object attached to the AdSource. Thus, steps 1216–1222 are performed for each subscriber that has asked to receive events of the type being routed.

If, in step 1216, the time-to-live for the event is less than the time-spent field of the envelope, then the event has expired and is not routed further by the current hub (step 1218). Otherwise, in step 1220, filter 518 determines whether the event has contents that fall within parameters specified by the subscriber. The subscriber specified the content filter at the time it subscribed to the event type (see field 774 of FIG. 7). For example, a subscriber may have requested to receive only those SalesEvents having where the customer lives in Los Angeles. If the event has values in the range specified by the subscriber, then the event is sent to the subscriber in step 1222 (either directly or by way of its hub, as described below). Each subscriber may have specified a different content filter (or no content filter). For example, a first subscriber may have specified that it wishes to receive SalesEvents where the customer lives in Los Angeles and a second subscriber may have specified that it wishes to receive SalesEvents where the customer lives in San Francisco. In this example, it is possible that the event will match the first subscriber but not the second subscriber.

In step 1222, filter 518 sends the event to the matching subscriber. The subscriber may be a client of the current hub, in which case the event is sent directly to the subscriber. Alternately, the subscriber may be connected to a neighboring hub, either directly or indirectly. If a matching subscriber is connected to a neighboring hub, the current hub will route the event to the neighboring hub (unless the neighboring hub is the hub originating the event, as determined from field 802 of the envelope, see FIG. 8). The current hub also will not route the event to a hub that has already seen the event (as determined from the routing blocks attached to the event, see FIG. 9).

In the described embodiment, the current hub only routes the event to a neighboring hub a single time, even if the neighboring hub has more than one matching subscription. Thus, if subscription object 651 of FIG. 6(*a*) matches the event, the event is forwarded to neighboring hub B. If subscription object 652 also matches the event, it is not necessary to forward the event to the neighboring hub B a second time. When neighboring hub B receives the event, it also will perform the steps of FIG. 12 to determine whether any of its client subscribers match the event.

FIG. 8 shows a format of an envelope data structure of an event. The preprocessor of FIG. 5 adds an envelope to an event received from its subscriber before the event is published. An envelope is associated with each event and includes an origin hub 802, an adname 804, a publisher name 806, a territory name 808, an initial time stamp 810, a time to live 812, a priority 814, flags 816, and a time spent field 822. Flags 816 are unused in the described embodiment. In an alternate embodiment, the flags may indicate, e.g., whether an event is "persistent" or "transient."

FIG. 9 shows an example format of two routing blocks of an event. Each hub adds a routing block to an event that it routes through itself. The API also includes a get_current_route_info routine that returns information about the actual route that an event took to reach a certain subscriber. Routing information is stored by the system as linked list, one entry for each hub visited. Each entry includes: an outgoing time stamp for the current hub, a hub name of the current hub, and a territory name of the current hub. The routing information optionally includes a sixty-four bit sequence number initially assigned to the event by the publisher.

V. Territories

Each territory 130 and 140 of FIG. 1 is a collection of hubs with a common event dictionary. Territories reflect organization, and are not necessarily tied to geography or direct physical connectivity. In the described embodiment, all hubs within a territory must be fully connected, because advertisement information is not forwarded across territories. Thus, there is always some path, although it may be indirect, between two hubs within a territory without having to leave the territory. In a preferred embodiment, hierarchies of territories exist in which lower level territories inherit the event dictionaries of their parent territory. For example, a corporation may choose to have a territory for each subsidiary, with all of them understanding certain "corporate events."

A hub preferably may belong to only one territory. When a client (a publisher or a subscriber) connects to a hub, it specifies to which territory or territories it belongs. A client must belong to a territory because the meaning of an event, for example a SalesOrder, may be different in different territories. In the described embodiment, each hub has a predetermined default territory that is used if the application developer does not specify a territory.

In an alternate embodiment, multi-territorial hubs are especially useful for inter-company communication. Two companies that decide to communicate using the described embodiment of the present invention may set up a joint territory, agreeing upon some event types and a format to be shared. The hubs connecting the two companies will only forward events of this joint territory, since the territory information is kept as part of the advertisement, as described below in connection with event routing.

VI. Database Connectivity

Figure 13:
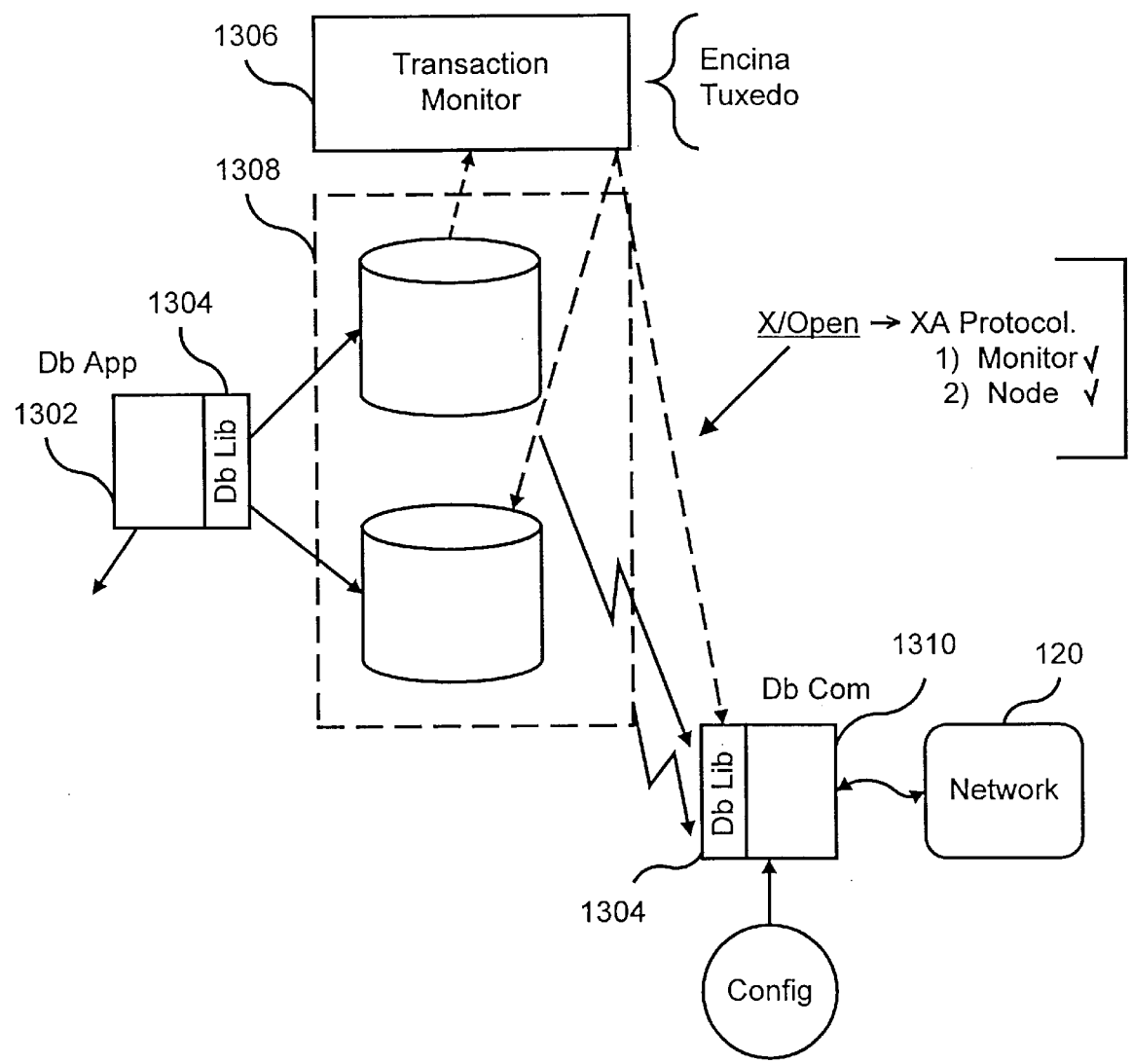
FIG. 13 is a block diagram of a data base application incorporated into the network of FIG. 1.

FIG. 13 is a block diagram of a data base application 1302 incorporated into the network 120 of FIG. 1. Database application 1302, which includes a database library having interface routines 1304, allows users to access information in data base 1308. Data base 1308 can be a data base manufactured by, for example, Oracle, Sybase, or Informix. The invention can be implemented using any appropriate data base that is capable of operating in conjunction with a transaction monitor.

FIG. 13 also includes a transaction monitor 1306. Transaction monitor 1306 preferably is the Encina transaction monitor, manufactured by Transarc Corporation. It can also be, for example, the Tuxedo transaction monitor manufactured by Novell. Alternately, any appropriate transaction monitor can be used to implement the present invention. A data base connecter 1310 having a data base library 1304 connects to network 120 to transmit and receive data from network 120. Data base connecter 1310 may include software performing hub functions or may connect to a separate hub. In FIG. 13, data base application 1302 sends information to data base 1308. Data base application 1302 also requests information from data base 1308 and displays that information in human readable form.

Data base connecter 1310 can be a publisher, a subscriber, or both. If data base connecter 1310 is a publisher, for example, it may publish an event each time a value is changed in data base 1302. It could also, for example, publish events at regular time intervals, reflecting the data that has been updated in the data base since the last publication. If data base 1302 is a subscriber, it stores the information of events it receives in data base 1302. The described embodiment includes a configuration file (not shown) for data base connecter 1310. The configuration file specifies, for example, whether the database connection will be a publisher, a subscriber, or both. The configuration file also includes, for example, a description of events to publish and/or subscribe to. The configuration file also specifies information concerning the layout of data base 1308.

Figure 14:
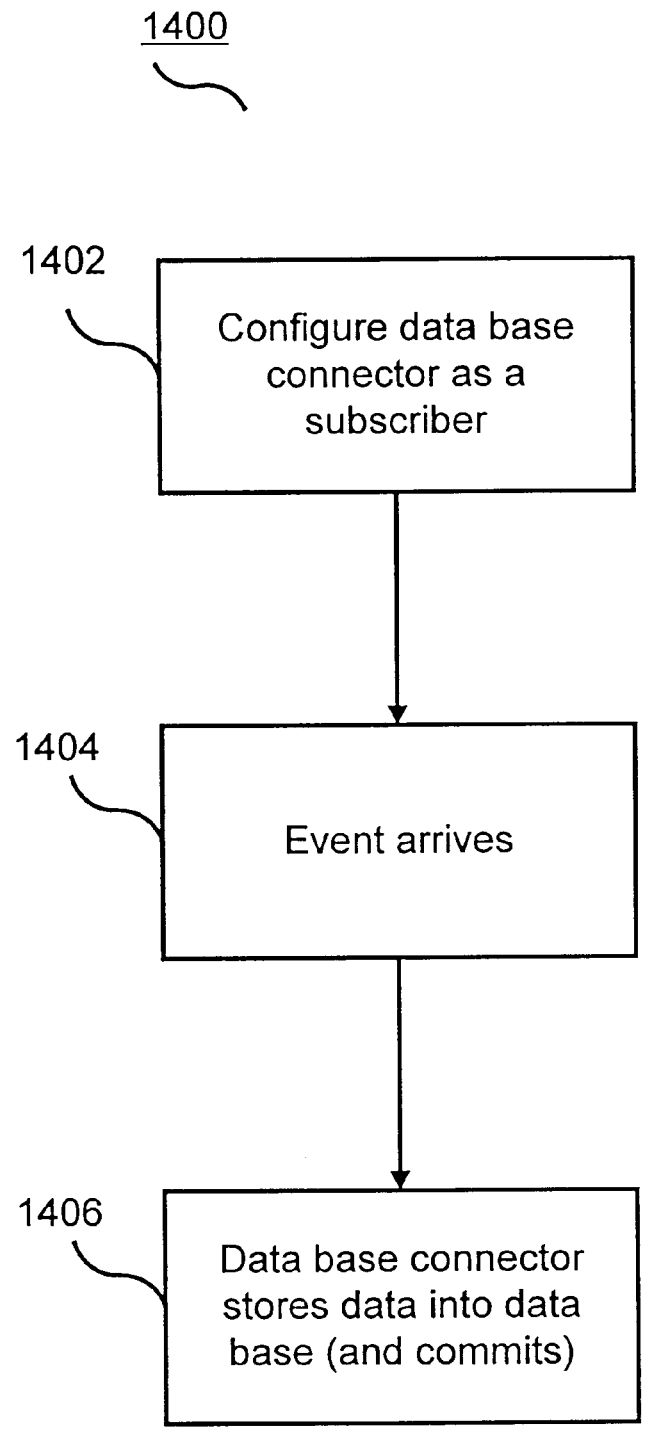
FIG. 14 is a flow chart showing steps performed when the data base is a subscriber.

FIG. 14 is a flow chart 1400 showing steps performed when the data base is a subscriber. For example, as events are received from network 120, data from the events are added to data base 1302. Flow chart 1400 assumes that data base connector 1310 has already registered itself and its subscription(s), as described above. When an event is received by data base connecter 1310 in step 1402, the data base connector maps and stores the data in the event into data base 1306. The data is not "committed" to the data base until the data has been completely stored in the data base. "Commitment" means that the data is actually entered in the data base. Until the changes to the data is committed, they are kept in a temporary storage location. Thus, uncommitted data base can be "rolled back" and the data transaction cancelled at any time up until the "commit" operation is performed. During a "roll back" the changes in the data in the temporary storage are discarded and the data base is retained in its state before the changes were made. Under certain circumstances data base connector 1310 will not issue a "commit" command until a certain event is received.

Figure 15:
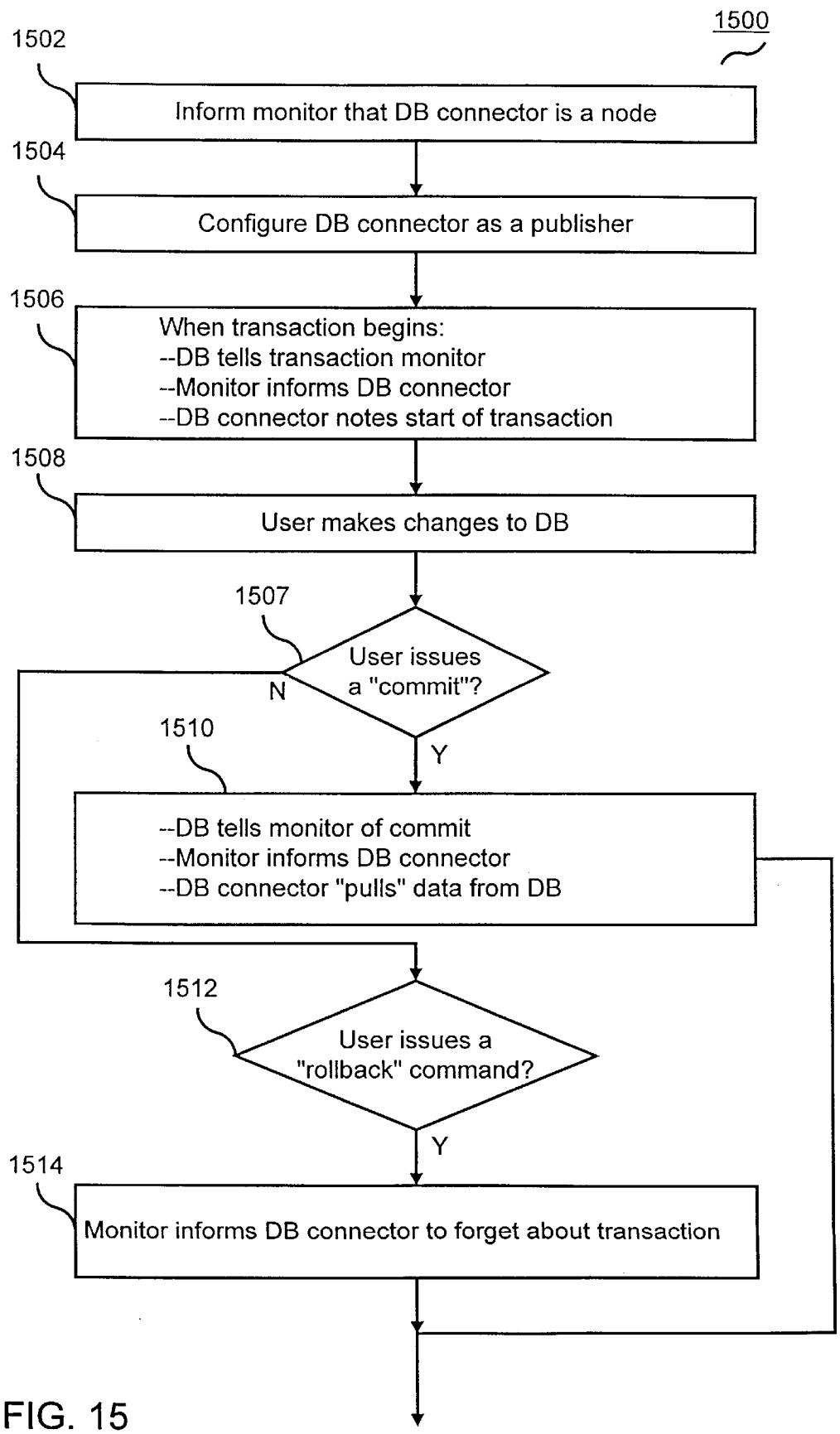
FIG. 15 is a flow chart showing steps performed when the data base is a publisher

FIG. 15 is a flow chart 1500 showing steps performed when the data base is a publisher. For example, as a human user adds, deletes and modifies data in the data base 1302, data connector 1310 sends periodic events to network 120.

In step 1502, the transaction monitor 1306 is informed that data base connector 1310 is a "node." The exact manner in which this step is performed will vary, depending on the manufacturer of the transaction monitor 1306, but the step generally is well-known to persons of ordinary skill in that art. In step 1504, the data base connector 1310 registers itself and its advertisement(s), as described above.

Steps 1506–1512 show steps performed, e.g., as the user makes changes to data base 1308. When a data base transaction begins in step 1506, data base 1308 informs transaction monitor that a transaction has begun, using, e.g., X/Open's XA protocol. Transaction monitor 1306 informs data base connector 1310 that a transaction is occurring, and data base connector 1310 notes the transaction. In step 1508, changes are made to the data base by the user, but the user has not committed the changes).

If, in step 1507, the user (or software making changes) indicates that the transaction should commit, this fact is communicated to transaction monitor 1306 in step 1510. Transaction monitor 1306 informs data base connector 1310, which pulls the committed data from data base 1308 and publishes an event including the committed data. Events are published as shown in FIG. 12. If, in step 1512 the user (or software making changes) indicates that the transaction should roll back, this fact is communicated to transaction monitor 1306. Transaction monitor 1306 informs data base connector 1310, which "forgets" about the changes of step 1506 and does not publish an event. Thus, the described embodiment takes into account the commitment and roll back operations common to commercial data base operation.

In an alternate embodiment, where the data base product 1302 used does not include a transaction monitor, data base connector 1310 can act as a transaction monitor when connecting with data base 1308. Data base connector 1310 still acts as a publisher and/or subscriber in this configuration. Data base 1308 thinks that it is connected to a transaction monitor, when it is really connected to data base connector 1310.

VII. Summary

In summary, a preferred embodiment of the present invention includes a plurality of "publisher" entities, who publish information, and a plurality of "subscriber" entities, who request and use the information. Publishers and subscribers are connected to each other through a network. The network is a "store and forward" network whose routing is "content-based."

In the described embodiment of the present invention, the basic quanta of information is called an "event." Publishers publish events and subscribers subscribe to events that match criteria defined by the subscriber. Publication and subscription are performed asynchronously. Publishers and subscribers do not have direct knowledge of each other. The system receives published event from a publisher and routes the event to all appropriate subscribers. Each subscriber is guaranteed to receive all events published on the system if, and only if, they match the subscription criteria specified by the subscriber.

The described embodiment of the present invention makes it easy to integrate legacy systems, legacy applications, and legacy hardware into the system and attempts to minimize the amount of information that a user must learn to use the system. A legacy data base can be added to the network by way of a data base connector, which can be a publisher, a subscriber, or both.

Other embodiments will be apparent to those skilled in the art from consideration of the specification and practice of the invention disclosed herein. It is intended that the specification and examples be considered as exemplary only, with a true scope of the invention being indicated by the following claims.

---

Twenty-three system events are used to communicalte between hubs. The share some of the header structure of normal events, but are otherwise totally different and processed outside of the normal event code path.
The system event structure is defined in include/nxs_syspackP.hh:

```
typedef struct nxsSystemEventHeader {
    nxsULong length;              Byte length of the event
    nxsULong magic_number;        Used to detect bogus events
    nxsULong nexus_version;       Nexus version number
    nxsULong routing_offset;      nxsEventRoutingEntry
    nxsULong sys_event_type;      NXS_SYS_EVENT_*
    nxsULong data_offset;         String data
} nxsSystemEventHeader;
```

The values for sys_event_type can be found in transport/hub/sysevent.hh. All system event processing code is declared in nexushub.hh (as methods of NexusHub) and defined in system.cc.
The system event data is a string composed of spaced separated tokens. The possible tokens are:
string    string of any characters except <space> and <rml>
/string/  a string of any characters except _(\037) surrounded by _(\037)
long      a signed 32-bit value
ulong     an unsigned 32-bit value
Object references are transfered in stringified form.
System events are used for several styles of communication. During connection establishment, system events are used as peer-to-peer messages. These events are not seen by other hubs. Most other events affect the state of the territory and may be forwarded throughtout the territory graph. A few events may be sent from a hub to itself.
NXS_SYS_EVENT_CONNECT_HUB
/string/  Sending hub name
/string/  Sending hub territory
string    Sending hub incoming EventQueue::PushConsumer
ulong     Receiving hub's cost
ulong     Sending hub's cost
This event is sent as a result of a call to NexusAdmin::HubAdmin::conncetHub. The sending hub has already created the Neighbor and EventQueue for the connection. The receiving hub does likewise when it receives the system event. Note that the sending hub already has the incoming EventQueue::PushConsumer of the receiving via an
argument to NexusAdmin::HubAdmin::connectHub. If this is the first connection for
the receiving hub (it is joining a territory), then it needs to get the territory's shared data
(event types, etc.). System events are used to request this information from the sending
hub: NXS_SYS_EVENT_REQUEST_EVENTTYPE, and
NXS_SYS_EVENT_REQUEST_ADVERTISEMENTS. If the hub is already a
member of the territory, it sends its routes to the sender with
NXS_SYS_EVENT_NEW_ROUTES. The receiving hub always requests routes from
the sender with NXS_SYS_EVENT_REQUEST_ROUTES. If the connection cannot
be created, for example the territory name is wrong, the receiver sends a
NXS_SYS_EVENT_CONNECT_FAILED.
NXS_SYS_EVENT_CONNECT_FALIED
/string/   Sending hub name
/string/   Sending hub territory
/string/   Reason for connection failure
Sent when connection establishment failed. Clean up data structures.
NXS_SYS_EVENT_DISCONNECT_HUB
/string/   Sending hub name (or neighbor name)
/string/   Sending hub territory
This system event can be sent to self or to another hub. Sent to self as a result of call to
NexusAdmin::HubAdmin::disconnectHub. In this case, the first argument is the name
of the neighbor hub. The hub sends a similar event to the neighbor (containing the name
of the sending hub) and does a connection shutdown. This may cause the following
system events to be sent: NXS_SYS_EVENT_FAIL_SUBSCRIPTIONS,
NXS_SYS_EVENT_DELETE_ROUTES,
NXS_SYS_EVENT_DELETE_ADVERTISEMENTS. One the connection clean-up
events are sent, a NXS_SYS_EVENT_END_OF_STREAM is delivered.
The sequence of events is the same on the neighbor hub receiving
NXS_SYS_EVENT_DISCONNECT_HUB.
NXS_SYS_EVENT_END_OF_STREAM
/string/   Sending hub name
/string/   Sending hub territory
Indicates the last event to be seen on a connection. Clean up data structures.
NXS_SYS_EVENT_REQUEST_EVENTTYPES
/string/   Sending hub name
/string/   Sending hub territory
Send event types to the sender with NXS_SYS_EVENT_NEW_EVENTTYPE_FILES.
NXS_SYS_EVENT_NEW_EVENTTYPE_FILES
long       Number of files F
lond       Number of types T
           Repeated F times:
/string/   .nexus file contents
/string/   .ifr file contents
           Repeated T times:
sting      Event type name
Load the IFR and Nexus files into the IFR and created the given event types. The event
is forwarded to all connected neighbors except the sender and neighbors who have
already seen the event.
NXS_SYS_EVENT_FORWARD_EVENTTYPE_FILE
ulong      Address of EventTypeFile state
long       Number of event types T
           Repeat T times:
string     Event type name
Send the event type file and event types to all connected neighbors. Only sent to self
when eventtypes are created or updated.
NXS_SYS_EVENT_REQUEST_ADVERTISEMENTS
/string/   Sending hub name
/string/   Sending hub territory
Deliver all advertisements to the sending hub with a
NXS_SYS_EVENT_NEW_ADVERTISEMENTS.
NXS_SYS_EVENT_NEW_ADVERTISEMENTS
long       Number of advertisements A
           Repeated A times:
/string/   Advertisement name
/sting/    Event type name
long       Priority
string     Storage mode; "p" or "t" for persistent or transient
ulong      Time to live (seconds)
/string/   Originating hub name
/string/   Originating hub territory
Create RemoteAds for the listed advertisements. The originating hub is where the
advertisement was created. The system event is forwarded to all connected neighbors
excepted the sender and neighbor who have already seen the event.
NXS_SYS_EVENT_CONNECTION_READY
/string/   Sending hub name
/string/   Sending hub territory
The sending hub is ready to use the connection. If the receiver is also ready, it replies
with a NXS_SYS_EVENT_CONNECTION_READY. If the connection is already
established the system event is ignored.
NXS_SYS_EVENT_FORWARD_ADVERTISEMENT

```
string     Advertisement name
Send the name advertisement to all connected neighbors. Only sent to self when
advertisements are created.
NXS_SYS_EVENT_CHANGE_ADVERTISEMENT
/string/   Advertisement name
/string/   Originating hub name
/string/   Originating hub territory
long       Priority
string     Storage mode; "p" or "t" for persistent or transient
ulong      Time to live
Update the matching RemoteAd with the given values. The system event is forwarded
to all connected neighbors except the sender and hubs that have already seen the event.
NXS_SYS_EVENT_DELETE_ADVERTISEMENTS
long       Number of Advertisements A
           Repeated A times:
/string/   Advertisement name
/string/   Originating hub name
/string/   originating hub territory
Delete the associated RemoteAds and related data structures. Sent by the originating
hub when an advertisement is deleted. The system event is forwarded to all connected
neighbors except the sender and hubs that have already seen the event.
NXS_SYS_EVENT_REQUEST_ROUTES
/string/   Sending hub name
/string/   Sending hub territory
Deliver all routing information to sender with NXS_SYS_EVENT_NEW_ROUTES.
NXS_SYS_EVENT_NEW_ROUTES
long       Number of routes R
           Repeated R times:
/string/   Advertisement name
/string/   Originating hub name
/string/   Originating hub territory
long       Cost
Record the existence of a route from the sender to the given advertisement at the given
cost. AdSource objects are created and if this is the first route to the advertisement, the
local clients are checked for subscription matches. This may result in a
NXS_SYS_EVENT_NEW_SUBSCRIPTIONS to the sender of
NXS_SYS_EVNET_NEW_ROUTES. Each route is considered seperately for
forwarding. The route is not forwarded to the sender, the originating hub, or to a hub
that has already seen the event. The route is only forwarded if it is the first route for the
RemoteAd, or it is the second route and the destination hub is current route provider.
The cost field of the forwarded event is incremented by the cost of the connection over
which the event was received.
This system event may mark the end of connection setup. If the event came from a
neighbor that is not yet fully connected,
NXS_SYS_EVENT_CONNECTION_READY is sent to the neigbor.
NXS_SYS_EVENT_CHANGE_ROUTES
long       Number of route change R
/string/   Originating hub name
/string/   Origination hub territory
           Repeated R times:
/string/   Advertisement name
long       Cost
Change the cost of a route. Find the matching RemoteAd and AdSource and update its
cost value. The system event is forwarded to all connected neighbors except the sender
and neigbor who have already seen the event.
NXS_SYS_EVENT_DELETE_ROUTES
long       Number of routes R
           Repeated R times:
/string/   Advertisement name
/string/   Originating hub name
/string/   Origination hub territory
Delete the routes (AdSource) for the given advertisement (RemoteAd). Any
subscriptions which were fed by that route are failed. This may result in
NXS_SYS_EVENT_FAIL_SUBSCRIPTIONS sent to neighbors who have
subscriptions registered for the advertisement. Forwarding of each deleted route is
considered separately and only if the last route to the advertisement was deleted. The
system event is not forwarded to the sender or the originating hub.
NXS_SYS_EVENT_CHANGE_CONNECTION
/string/   Sending hub name
/string/   Sending hub territory
long       Delta to sending hub's connection cost
Update their cost for the connection.
NXS_SYS_EVENT_NEW_SUBSCRIPTIONS
long       Number of subscriptions S
           Repeated S times:
/string/   Advertisement name
/string/   Advertisement hub name
/string/   Advertisement hub territory
/string/   Filter expression
ulong      Owner id in sender
```

```
ulong      Subscription id in sender
Register subscriptions from the sender against the given advertisements. Create a
Subscription on the sending neighbor and tell the RemoteAd about it. The RemoteAd
tells the current AdSource which creates a Sink for the Neighbor (if one does not yet
exist). The Sink adds a SubscriptionRef for the Subscription.
If the advertisement if from another hub, forward a system event for the new
subscription to the neighbor supplying the current route.
The owner and subscription ids are used to locate the subscription when it is canceled
and to identify it when it fails.
If there is a failure during subscription registration, an
NXS_SYS_EVENT_FAIL_SUBSCRIPTIONS is returned to the sender.
NXS_SYS_EVENT_CANCEL_SUBSCRIPTIONS
long       Number of subscriptions S
           Repeated S times:
ulong      Owner id in sender
ulong      Subscription id in sender
Cancel the listed subscriptions. This event can be sent from self or a neighbor. Remove
all references to the subscription from all current AdSources. This should delete all
reference to the Subscription by Sink owned SubscriptionRefs. The cancel is forwarded
to all neighbors which could possibly feed the subscription.
NXS_SYS_EVENT_FAIL_SUBSCRIPTIONS
long       Number of failures S
           Repeated S times:
ulong      Owner id in receiver
ulong      Subscription id in receiver
/string/   Hub name where failure occurred
/string/   Territory where failure occurred
/string/   Failure reason
Remove reference to the subscriptions from AdSource. The subscription itself is not
affected by the failure. If the subscription was from a neighbor, the failure is forwarded
back to the originating hub.
NXS_SYS_EVENT_FORWARD_SUBSCRIPTION
ulong      Client id
ulong      Subscription id
Forward the new subscription to neighbor which can feed it. Tell all matching
RemoteAds about the subscription. Each RemoteAd tells its current AdSource which
creates a Sink for the Client (if one does not yet exist). The Sink adds a SubscriptionRef
for the Subscription. Send a NXS_SYS_EVENT_NEW_SUBSCRIPTIONS to the
current source for each non-local RemoteAd.
NXS_SYS_EVENT_DELETE_EVENTTYPE
string     Event type name
Destroy the event type. The system event is forwarded to all connected neighbors
except the sender and hubs that have already seen the event.
```

What is claimed is:

1. A method of connecting a data base to a publisher/subscriber network, so that the data base can publish events to the network, the method comprising the steps, performed by the data processing system, of:

provinding a link so that the data base can communicate with a data base connector computer program by way of a transaction monitor computer program;

setting up the data base connector as a publisher hub in the network;

receiving input, by the data base, from a user that alters data in the data base;

informing the transaction monitor that the data has been altered;

receiving input from the user indicating that the altered data should be committed;

informing the transaction monitor that the altered data is committed; and sending, by the data base connector, in accordance with a message from the transaction monitor that the data is committed, a published event to the network in accordance with the altered data.

2. The method of claim 1, further including the steps of:

receiving input from the user indicating that the altered data should be rolled back;

informing the transaction monitor that the altered data is rolled back; and refraining, by the data base connector, from sending the altered data to the network in accordance with the rollback.

3. A method of connecting a data base to a publisher/subscriber network, so that the data base can subscribe to events to the network, the method comprising the steps, performed by the data processing system, of:

providing a link so that a data base connector computer program can communicate with the data base;

setting up the data base connector as a subscriber hub in the network;

receiving, by the data base connector, an event from the network;

sending, by the data base connector, data in accordance with the received event to the data base; and committing, by the data base connector, the data in the data base.

4. The method of claim 1, further comprising the step of:

sending the event, by the data base connector, to one of its neighbor hubs, where a data structure in the data base connector indicates that the neighbor hub is on the least-cost path to a subscriber for the event.

5. The method of claim 1, further comprising the steps of:

receiving an event by the data base connector;

determining, by the data base connector, in accordance with a data structure of the data base connector, that the data base has subscribed to the event; and sending, by the data base connector, the event to the data base.

6. The method of claim 1, further comprising the step of:

receiving an event, by the data base connector;

determining, by the data base connector, in accordance with a data structure of the data base connector, that a neighbor hub is connected either directly or indirectly on the least-cost path to a subscriber for the event; and sending, by the data base connector, the event to its neighbor hub, so that the event can be forwarded to the subscriber.

7. The method of claim 1, wherein the sending step includes the step of:

sending an event, by the data base connector, to one of its neighbor hubs when a data structure in the data base connector indicates that the data base subscribes to events having the type of the event.

8. The method of claim 1, wherein the sending step includes the step of:

sending an event, by the data base connector, to one of its neighbor hubs when a content filter in a data structure of the data base connector indicates that the data base subscribes to events having values found in the event.

* * * * *